US012628242B2

(12) United States Patent
Abotabl et al.

(10) Patent No.: US 12,628,242 B2
(45) Date of Patent: May 12, 2026

(54) CELL DRX/DTX-AWARE PERIODIC AND SEMI-PERSISTENT CONFIGURATION

(71) Applicant: QUALCOMM Incorporated, San Diego, CA (US)

(72) Inventors: Ahmed Attia Abotabl, San Diego, CA (US); Diana Maamari, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 18/461,842

(22) Filed: Sep. 6, 2023

(65) Prior Publication Data

US 2025/0081284 A1      Mar. 6, 2025

(51) Int. Cl.
*H04W 76/28* (2018.01)
*H04W 72/0446* (2023.01)

(52) U.S. Cl.
CPC ....... *H04W 76/28* (2018.02); *H04W 72/0446* (2013.01)

(58) Field of Classification Search
CPC .......................... H04W 76/28; H04W 72/0446
See application file for complete search history.

(56) References Cited

FOREIGN PATENT DOCUMENTS

EP        4236554 A1 *  8/2023  ............ H04W 72/23

OTHER PUBLICATIONS

Intel Corporation, R4-2319134, 'NR network energy saving RRM aspects—other aspects', 3GPP TSG-RAN WG4 Meeting #109, Nov. 13-17, 2023, pp. 1-9. (Year: 2023).*

* cited by examiner

*Primary Examiner* — Melvin C Marcelo
(74) *Attorney, Agent, or Firm* — ArentFox Schiff, LLP

(57) ABSTRACT

This disclosure provides methods, components, devices, and systems for enhancing communication efficiency and energy-saving in wireless networks by aligning periodic transmission occasions, including semi-persistently scheduled (SPS) periodic occasions, within cell Discontinuous Reception (DRX) and Discontinuous Transmission (DTX) cycles. Some aspects more specifically relate to user equipment (UE) obtaining a signal configuration from a network entity indicating periodicity and offset information for a signal or channel. In some examples, the periodicity and offset information is configured to align periodic transmission occasions of the signal or channel within an on duration of a cell DRX cycle or cell DTX cycle, beginning with respect to a reference time associated with the cell DRX cycle or cell DTX cycle. The UE may then efficiently communicate the signal or data in the channel with the network entity within the on duration according to the periodicity and offset information with reduced latency, improving network performance.

30 Claims, 12 Drawing Sheets

FIG. 6

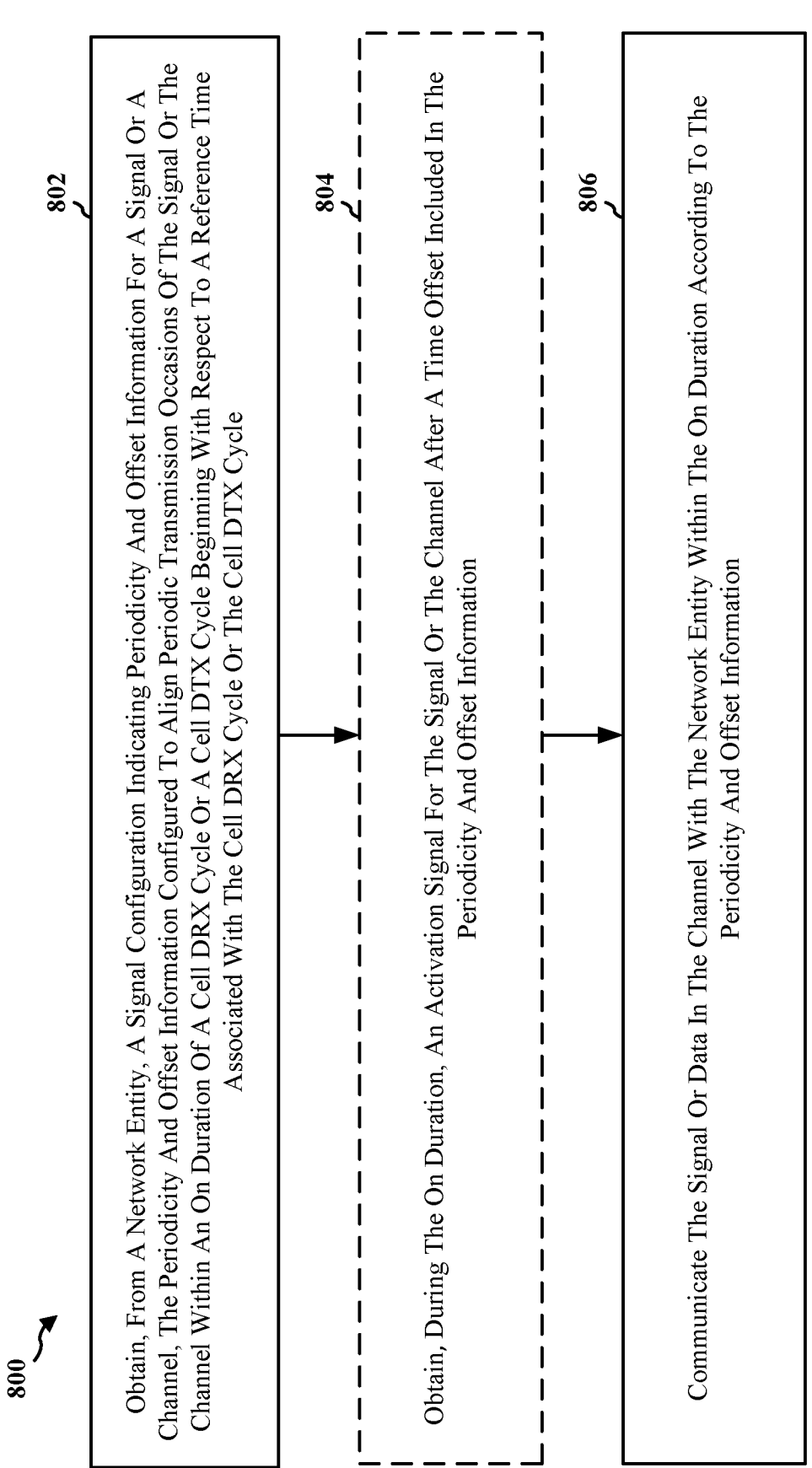

800

802 — Obtain, From A Network Entity, A Signal Configuration Indicating Periodicity And Offset Information For A Signal Or A Channel, The Periodicity And Offset Information Configured To Align Periodic Transmission Occasions Of The Signal Or The Channel Within An On Duration Of A Cell DRX Cycle Or A Cell DTX Cycle Beginning With Respect To A Reference Time Associated With The Cell DRX Cycle Or The Cell DTX Cycle 804 — Obtain, During The On Duration, An Activation Signal For The Signal Or The Channel After A Time Offset Included In The Periodicity And Offset Information 806 — Communicate The Signal Or Data In The Channel With The Network Entity Within The On Duration According To The Periodicity And Offset Information

FIG. 8

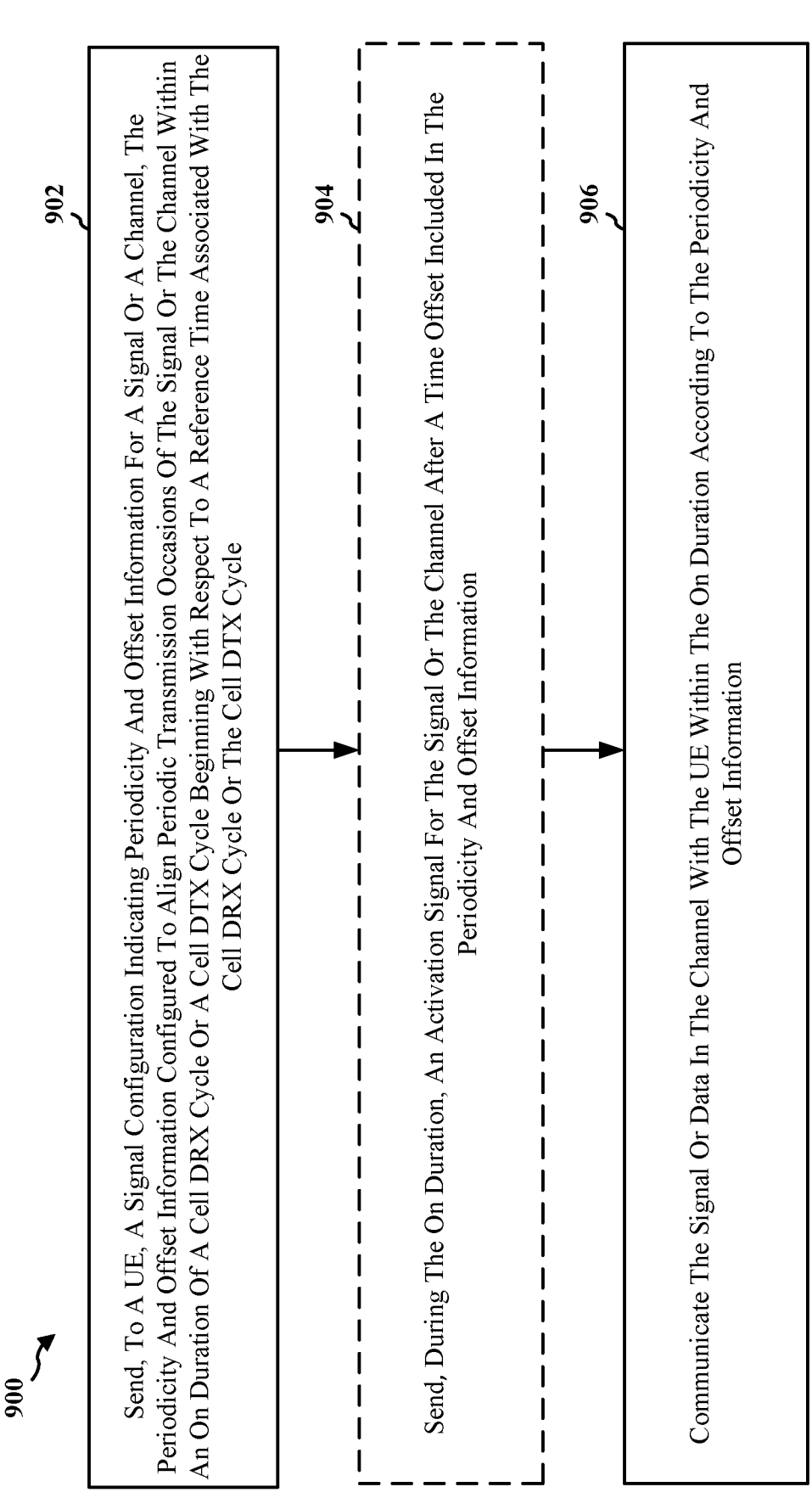

902 Send, To A UE, A Signal Configuration Indicating Periodicity And Offset Information For A Signal Or A Channel, The Periodicity And Offset Information Configured To Align Periodic Transmission Occasions Of The Signal Or The Channel Within An On Duration Of A Cell DRX Cycle Or A Cell DTX Cycle Beginning With Respect To A Reference Time Associated With The Cell DRX Cycle Or The Cell DTX Cycle 904 Send, During The On Duration, An Activation Signal For The Signal Or The Channel After A Time Offset Included In The Periodicity And Offset Information 906 Communicate The Signal Or Data In The Channel With The UE Within The On Duration According To The Periodicity And Offset Information

CELL DRX/DTX-AWARE PERIODIC AND SEMI-PERSISTENT CONFIGURATION

TECHNICAL FIELD

The present disclosure relates to wireless communication, and more particularly, to techniques for aligning periodic transmission occasions of periodic and semi-persistent signals or channels within cell Discontinuous Reception (DRX) and Discontinuous Transmission (DTX) cycles to improve communication efficiency and energy-saving in wireless networks.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure may be implemented in an apparatus for wireless communication, where the apparatus is a user equipment (UE). The apparatus includes one or more memories, and one or more processors each communicatively coupled with at least one of the one or more memories. The one or more processors, individually or in any combination, are operable to cause the apparatus to obtain, from a network entity, a signal configuration indicating periodicity and offset information for a signal or a channel. The periodicity and offset information is configured to align periodic transmission occasions of the signal or the channel within an on duration of a cell Discontinuous Reception (DRX) cycle or a cell Discontinuous Transmission (DTX) cycle, beginning with respect to a reference time associated with the cell DRX cycle or the cell DTX cycle. The apparatus communicates the signal or data in the channel with the network entity within the on duration according to the periodicity and offset information.

Another innovative aspect of the subject matter described in this disclosure may be implemented in a method of wireless communication performable at a UE. The method includes obtaining, from a network entity, a signal configuration indicating periodicity and offset information for a signal or a channel. The periodicity and offset information is configured to align periodic transmission occasions of the signal or the channel within an on duration of a cell DRX cycle or a cell DTX cycle, beginning with respect to a reference time associated with the cell DRX cycle or the cell DTX cycle. The method also includes communicating the signal or data in the channel with the network entity within the on duration according to the periodicity and offset information.

Another innovative aspect of the subject matter described in this disclosure may be implemented in an apparatus for wireless communication, where the apparatus is a network entity. The apparatus includes one or more memories, and one or more processors each communicatively coupled with at least one of the one or more memories. The one or more processors, individually or in any combination, are operable to cause the apparatus to send, to a UE, a signal configuration indicating periodicity and offset information for a signal or a channel. The periodicity and offset information is configured to align periodic transmission occasions of the signal or the channel within an on duration of a cell DRX cycle or a cell DTX cycle, beginning with respect to a reference time associated with the cell DRX cycle or the cell DTX cycle. The apparatus communicates the signal or data in the channel with the UE within the on duration according to the periodicity and offset information.

Another innovative aspect of the subject matter described in this disclosure may be implemented in a method of wireless communication performable at a network entity. The method includes sending, to a UE, a signal configuration indicating periodicity and offset information for a signal or a channel. The periodicity and offset information is configured to align periodic transmission occasions of the signal or the channel within an on duration of a cell DRX cycle or a cell DTX cycle, beginning with respect to a reference time associated with the cell DRX cycle or the cell DTX cycle. The method also includes communicating the signal or data in the channel with the UE within the on duration according to the periodicity and offset information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A depicts a periodic SR configuration aligned with cell DRX on durations, and FIG. 5B shows a SPS configuration aligned with cell DTX on durations.

FIG. 6 is a diagram illustrating an example of a semi-persistent signal configuration defined with respect to a cell DRX cycle, specifically presenting a semi-persistent sounding reference signal (SRS) configuration aligned with cell DRX on durations.

FIG. 8 is a flowchart of a method of wireless communication performable at a UE.

FIG. 9 is a flowchart of a method of wireless communication performable at a network entity.

DETAILED DESCRIPTION

Figure 1A:
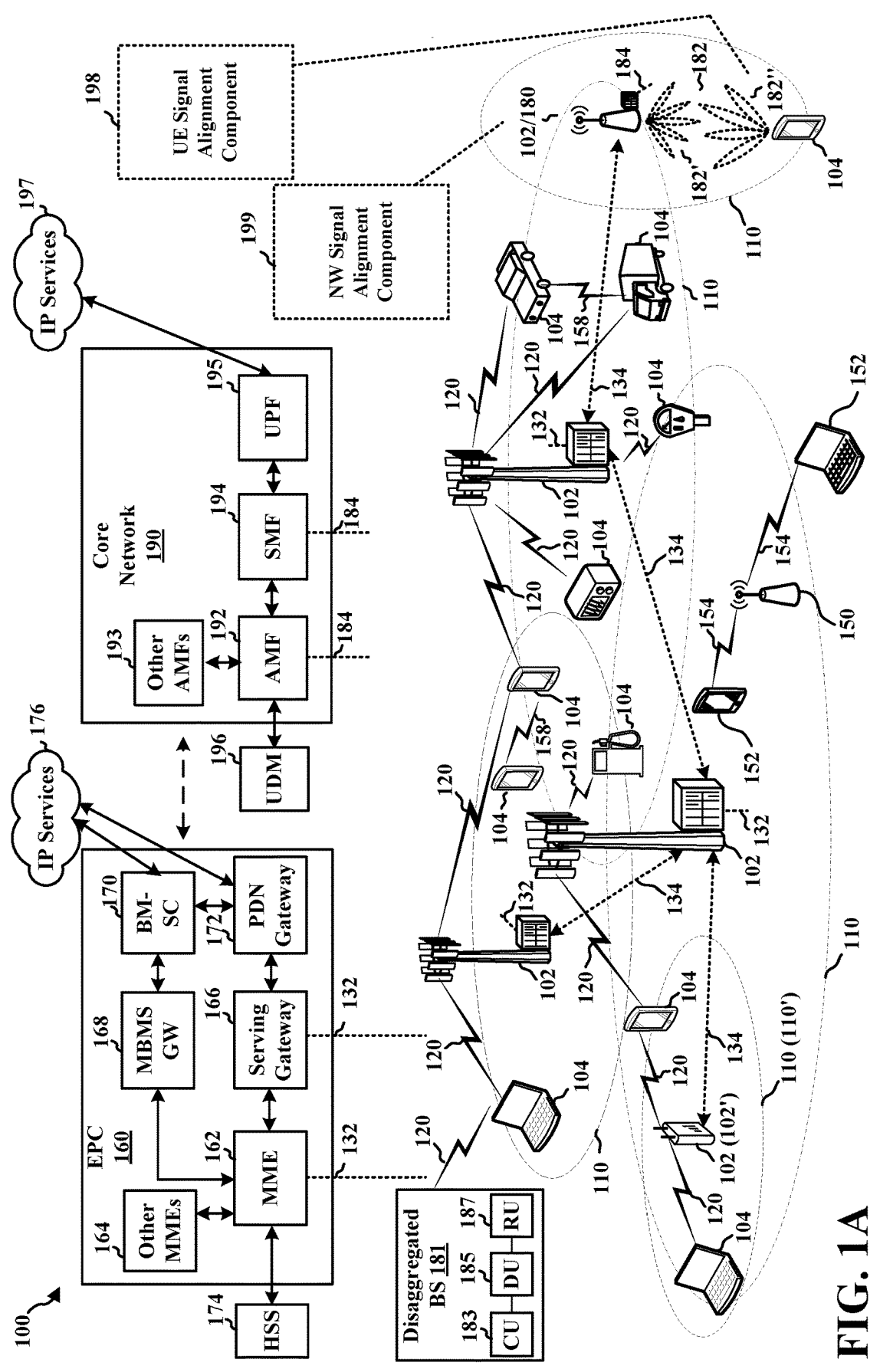
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the subject matter described in this disclosure relate to wireless communication and more particularly to techniques for aligning periodic transmission occasions of periodic and semi-persistent signals or channels within cell Discontinuous Reception (DRX) and Discontinuous Transmission (DTX) cycles to improve communication efficiency and energy-saving in wireless networks. Currently, cell DRX and DTX operations are used to save energy, but the misalignment of periodically and semi-persistently scheduled (SPS) transmission occasions with cell active durations may lead to inefficient communication and increased latency. Moreover, this misalignment may result in non-uniform scheduling opportunities for the UE, which may negatively impact network performance. Therefore, aspects of the present disclosure aim to improve the alignment of periodic and SPS transmission occasions with cell active durations for better communication efficiency and energy-saving. In particular, a user equipment (UE) may obtain signal configurations that define periodicity and offset information for signals or channels with respect to cell DRX or DTX cycles, and the UE may communicate the signals or data in the channels with a network entity during the cell active time according to the periodicity and offset information. In some examples, the configurations may dynamically adapt the number of consecutive valid occasions for transmission during a cell DRX or DTX cycle based on current network conditions or traffic demands. In some examples, the configurations may consider semi-persistent signal activation when aligning transmissions within cell DRX or DTX cycles. In various examples, the configurations may address challenges associated with periodic or semi-persistent signal transmissions or receptions by aligning and uniformly distributing periodic or semi-persistent signal or channel transmission occasions within active periods of cell DRX or DTX, reducing latency and improving communication efficiency.

Particular aspects of the subject matter described in this disclosure can be implemented to realize one or more of the following potential advantages. By obtaining signal configurations that define periodicity and offset information for signals or channels with respect to cell DRX or DTX cycles, alignment of periodic transmission occasions of periodic and semi-persistent signals or channels within cell DRX and DTX cycles may be achieved, leading to enhanced communication efficiency, reduced latency, and increased energy-saving in wireless networks. As the UE communicates the signals or data in the channels with a network entity during the cell active time according to the periodicity and offset information, the network performance may be optimized, and resource overloading may be avoided. Considering semi-persistent signal activation when aligning transmissions within cell DRX or DTX cycles may further improve communication efficiency and energy-saving for semi-persistent signals and channels. In these and other aspects, aligning and uniformly distributing periodic or semi-persistent signal or channel transmission occasions within active periods of cell DRX or DTX may lead to more consistent scheduling opportunities for the UE, ultimately enhancing overall network performance.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP)

packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G NR systems, may be arranged in multiple manners with various components or constituent parts. In a 5G NR system, or network, a network node, a network entity, a network device, a mobility element of a network, a RAN node, a core network node, a network element, or a network equipment, such as a BS, or one or more units (or one or more components) performing base station functionality, may be implemented in an aggregated or disaggregated architecture. For example, a BS (such as a Node B (NB), eNB, NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station 181 may be configured to utilize a protocol stack that is physically or logically distributed among two or more units (such as one or more central units (CU), one or more distributed units (DUs), or one or more radio units (RUs)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 1B:
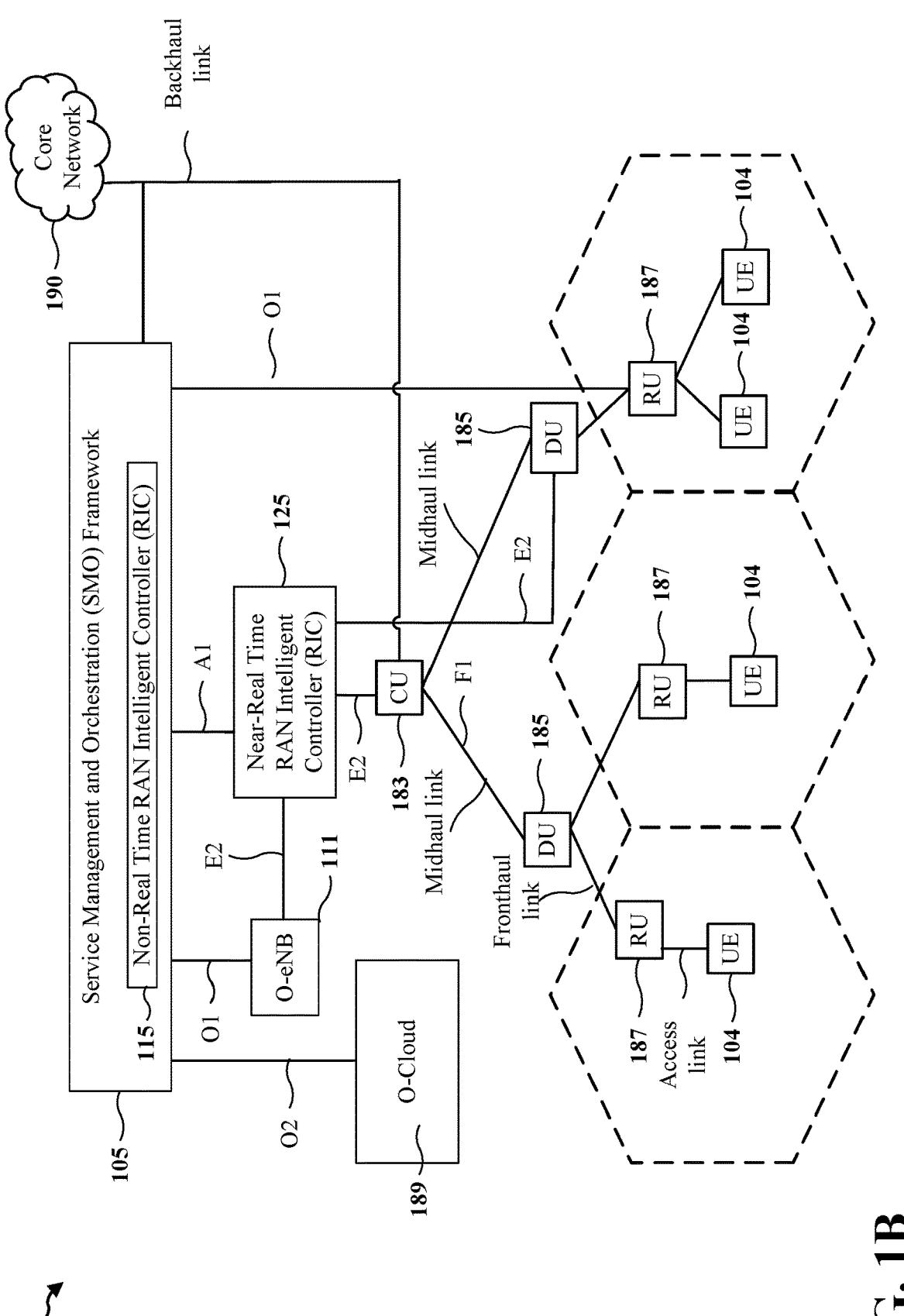
FIG. 1B shows a diagram illustrating an example disaggregated base station architecture.

FIG. 1B shows a diagram illustrating an example disaggregated base station 181 architecture. The disaggregated base station 181 architecture may include one or more CUs 183 that may communicate directly with core network 190 via a backhaul link, or indirectly with the core network 190 through one or more disaggregated base station units (such as a Near-Real Time RIC 125 via an E2 link, or a Non-Real Time RIC 115 associated with a Service Management and Orchestration (SMO) Framework 105, or both). A CU 183 may communicate with one or more DUs 185 via respective midhaul links, such as an F1 interface. The DUs 185 may communicate with one or more RUs 187 via respective fronthaul links. The RUs 187 may communicate respectively with UEs 104 via one or more radio frequency (RF) access links. In some implementations, the UE 104 may be simultaneously served by multiple RUs 187.

Each of the units, i.e., the CUs 183, the DUs 185, the RUs 187, as well as the Near-RT RICs 125, the Non-RT RICs 115 and the SMO Framework 105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 183 may host higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 183. The CU 183 may be configured to handle user plane functionality (i.e., Central Unit-User Plane (CU-UP)), control plane functionality (i.e., Central Unit-Control Plane (CU-CP)), or a combination thereof. In some implementations, the CU 183 may be logically split into one or more CU-UP units and one or more CU-CP units. The CU-UP unit may communicate bidirectionally with the CU-CP unit via an interface, such as the E1 interface when implemented in an O-RAN configuration. The CU 183 may be implemented to communicate with the DU 185, as necessary, for network control and signaling.

The DU 185 may correspond to a logical unit that includes one or more base station functions to control the operation of one or more RUs 187. In some aspects, the DU 185 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 185 may further host one or more low PHY layers. Each layer (or module) may be implemented with an interface configured to communicate signals with other layers (and modules) hosted by the DU 185, or with the control functions hosted by the CU 183.

Lower-layer functionality may be implemented by one or more RUs 187. In some deployments, an RU 187, controlled by a DU 185, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 187 may be implemented to handle over the air (OTA) communication with one or more UEs 104. In some implementations, real-time and non-real-time aspects of control and user plane communication with the RU(s) 187 may be controlled by the corresponding DU 185. In some scenarios, this configuration may enable the DU(s) 185 and the CU 183 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements, which may be managed via an operations and maintenance interface (such as an O1 interface). For virtualized network elements, the SMO Framework 105 may be configured to interact with a cloud computing platform (such as an open cloud (O-Cloud) 189) to perform network element life cycle management (such as to instantiate virtualized network elements) via a cloud computing platform interface (such as an O2 interface). Such virtualized network elements may include, but are not limited to, CUs 183, DUs 185, RUs 187 and Near-RT RICs 125. In some implementations, the SMO Framework 105 may communicate with a hardware aspect of a 4G RAN, such as an open eNB (O-eNB) 111, via an O1 interface. Additionally, in some implementations, the SMO Framework 105 may communicate directly with one or more RUs 187 via an O1 interface. The SMO Framework 105 also may include the Non-RT RIC 115 configured to support functionality of the SMO Framework 105.

The Non-RT RIC 115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 183, one or more DUs 185, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

Referring to FIGS. 1A and 1B, in certain aspects, the UE 104 may include a UE signal alignment component 198 that is configured to obtain, from a network entity, a signal configuration indicating periodicity and offset information for a signal or a channel, the periodicity and offset information configured to align periodic transmission occasions of the signal or the channel within an on duration of a cell DRX cycle or a cell DTX cycle beginning with respect to a reference time associated with the cell DRX cycle or the cell DTX cycle. The UE signal alignment component 198 may also be configured to communicate the signal or data in the channel with the network entity within the on duration according to the periodicity and offset information. Furthermore, in certain aspects, a network entity such as base station 102/180, disaggregated base station 181, or a component of disaggregated base station 181 such as CU 183, DU 185, or RU 187, may include a NW signal alignment component 199 that is configured to send, to a UE, a signal configuration indicating periodicity and offset information for a signal or a channel, the periodicity and offset information configured to align periodic transmission occasions of the signal or the channel within an on duration of a cell DRX cycle or a cell DTX cycle beginning with respect to a reference time associated with the cell DRX cycle or the cell DTX cycle. The NW signal alignment component 199 may also be configured to communicate the signal or data in the channel with the UE within the on duration according to the periodicity and offset information. Thus, proper alignment and uniform scheduling opportunities of periodic and SPS signals or channels across multiple cell DRX or DTX cycles may be achieved.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figures 2A, 2B, 2C, 2D:
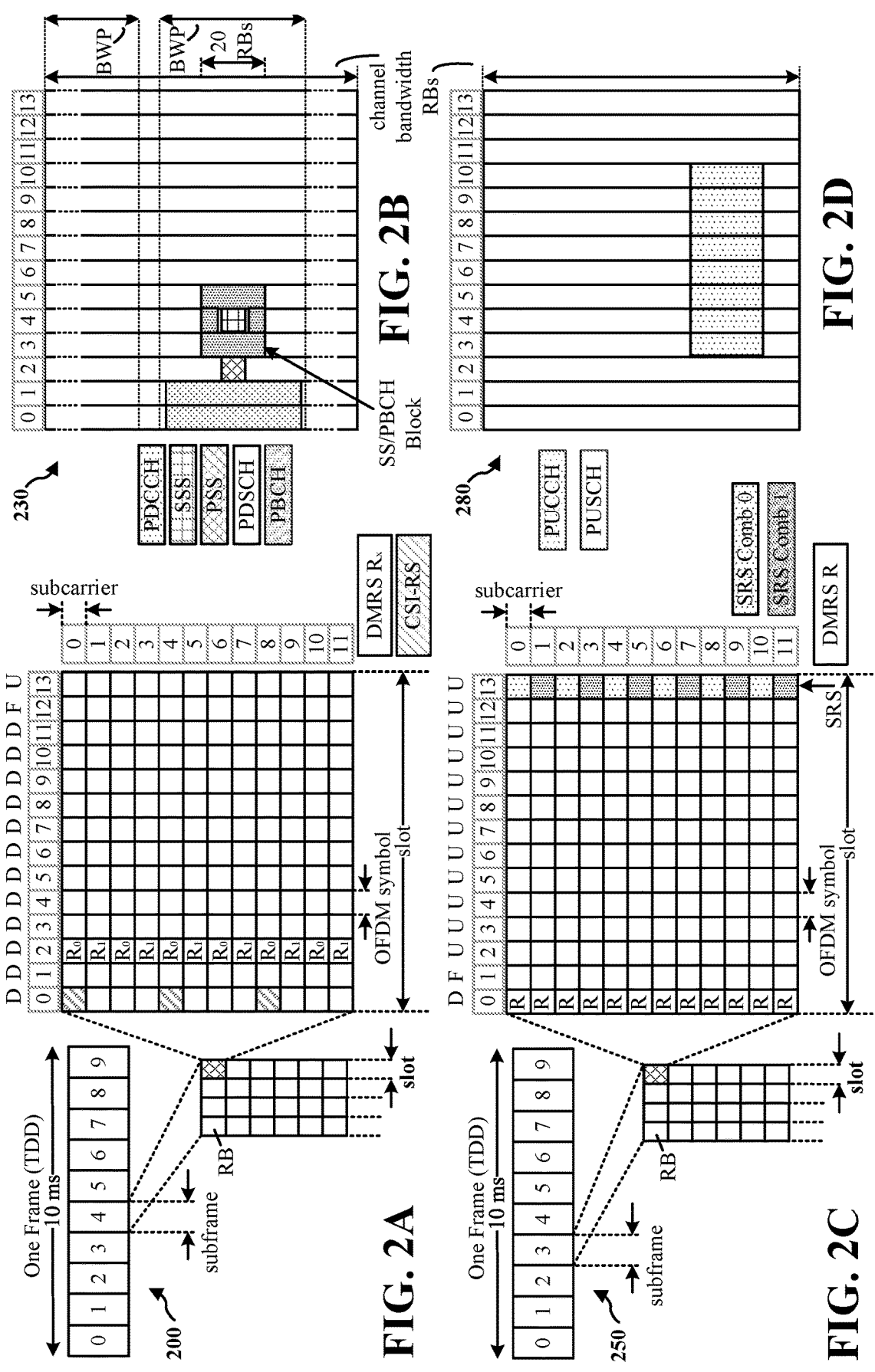
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology p=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data and may additionally be used to carry a buffer status report (BSR), a power headroom report (PHR), and/or UCI.

Figure 3:
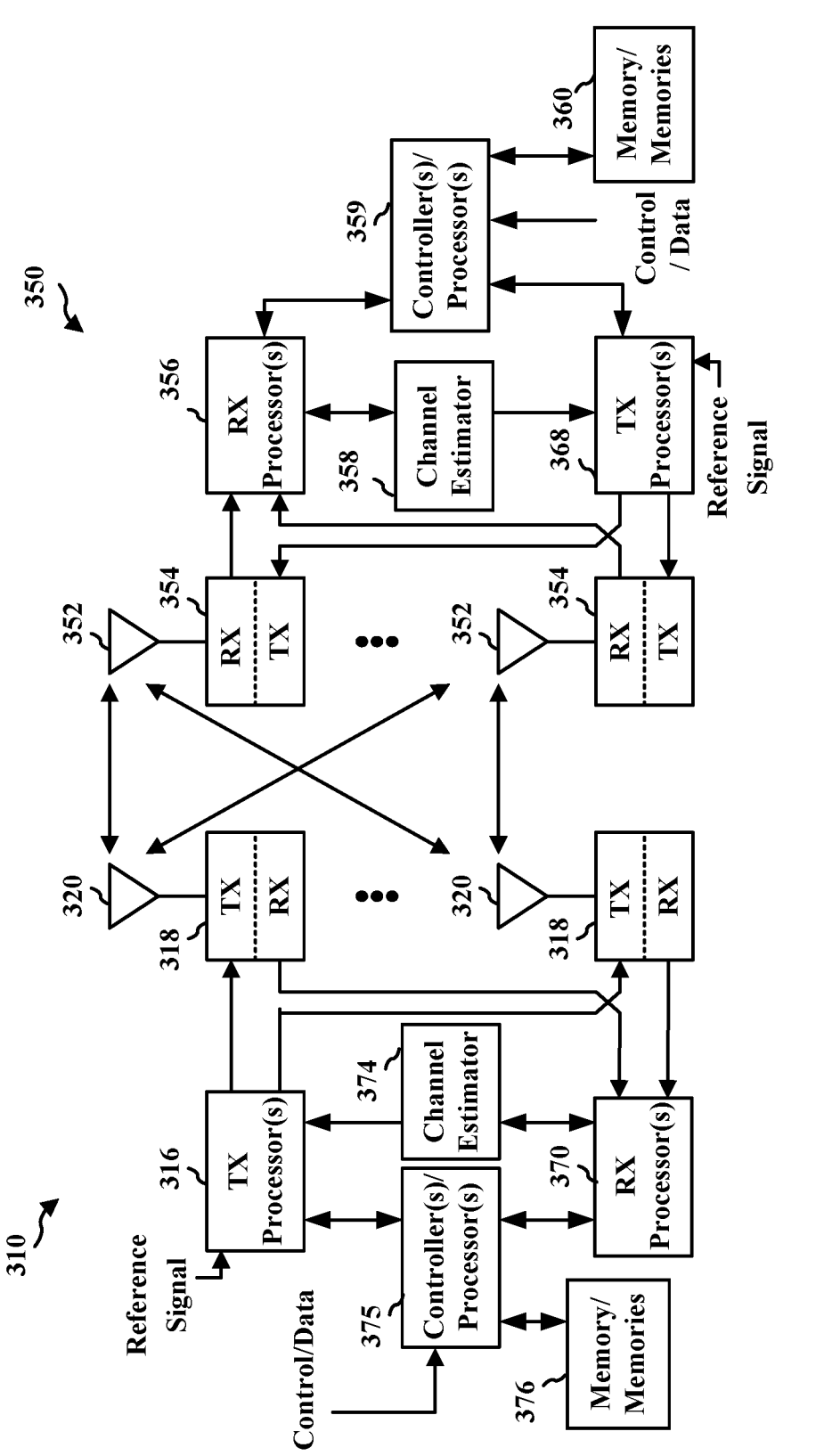
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to one or more controllers/processors 375. The one or more controllers/processors 375 implement layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The one or more controllers/processors 375 provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The one or more transmit (TX) processors 316 and the one or more receive (RX) processors 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The one or more TX processors 316 handle mapping to signal constellations based on various modulation and coding schemes (MCS) (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the one or more receive (RX) processors 356. The one or more TX processors 368 and the one or more RX processors 356 implement layer 1 functionality associated with various signal processing functions. The one or more RX processors 356 may perform spatial processing on the information to recover any spatial streams destined for the UE 350. If multiple spatial streams are destined for the UE 350, they may be combined by the one or more RX processors 356 into a single OFDM symbol stream. The one or more RX processors 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the one or more controllers/processors 359, which implement layer 3 and layer 2 functionality.

The one or more controllers/processors 359 may each be associated with one or more memories 360 that store program codes and data. The one or more memories 360, individually or in any combination, may be referred to as a computer-readable medium. In the UL, the one or more controllers/processors 359 provide demultiplexing between transport and logical channels, packet reassembly, deciphering, header decompression, and control signal processing to recover IP packets from the EPC 160. The one or more controllers/processors 359 are also responsible for error detection using an ACK and/or NACK protocol to support HARQ operations.

Similar to the functionality described in connection with the DL transmission by the base station 310, the one or more controllers/processors 359 provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the one or more TX processors 368 to select the appropriate coding and modulation schemes, and to facilitate spatial processing. The spatial streams generated by the one or more TX processors 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to one or more RX processors 370.

The one or more controllers/processors 375 may each be associated with one or more memories 376 that store program codes and data. The one or more memories 376, individually or in any combination, may be referred to as a computer-readable medium. In the UL, the one or more controllers/processors 375 provide demultiplexing between transport and logical channels, packet reassembly, deciphering, header decompression, control signal processing to recover IP packets from the UE 350. IP packets from the one or more controllers/processors 375 may be provided to the EPC 160. The one or more controllers/processors 375 are also responsible for error detection using an ACK and/or NACK protocol to support HARQ operations.

At least one of the one or more TX processors 368, the one or more RX processors 356, and the one or more controllers/processors 359 may be configured to perform aspects in connection with UE signal alignment component 198 of FIG. 1A.

At least one of the one or more TX processors 316, the one or more RX processors 370, and the one or more controller/processors 375 may be configured to perform aspects in connection with NW signal alignment component 199 of FIG. 1A.

New Radio (NR) network energy saving (NES) studies concentrate on minimizing energy consumption during transmission and reception in next-generation NodeB (gNB) base stations. Since gNBs serve as the foundation of 5G networks and are responsible for communication with UEs, such as smartphones and IoT devices, NES studies aim to identify techniques that may enhance network energy savings for both gNB and UE in terms of base station transmission and reception. For example, some techniques may involve investigating more efficient operational methods, refining the adaptation of transmissions and receptions across time, frequency, spatial, and power domains, and considering potential support or feedback from the UE. Additionally, some studies may examine information exchange and coordination across network interfaces to achieve energy savings.

In order to conserve energy during gNB reception and transmission, cell DRX and cell DTX techniques may be applied. Cell DRX is designed from the perspective of gNB reception and aims to decrease reception activities by restricting UE transmissions to occur only during a cell DRX on duration. This implies that the gNB receiver remains active during specific time intervals, thereby reducing the overall energy consumption. Similarly, cell DTX serves as a technique for conserving energy in gNB transmission by decreasing transmission activities. During the cell DRX or DTX on duration, the gNB actively receives or transmits signals respectively, while in the off duration, it enters a low-energy state, reducing energy consumption. To save power, the UE may be informed of the cell DRX or DTX operation to align its transmission and reception activities with cell DRX or DTX, respectively. For example, the UE may conserve power by performing DRX or otherwise avoiding unnecessary activation of its receiver during the cell DTX off duration. Thus, by employing either or both cell DRX and cell DTX techniques, energy conservation can be optimized in wireless networks for both gNBs and UEs, as both reception and transmission activities may be managed in a more energy-efficient manner.

Figures 4A, 4B:
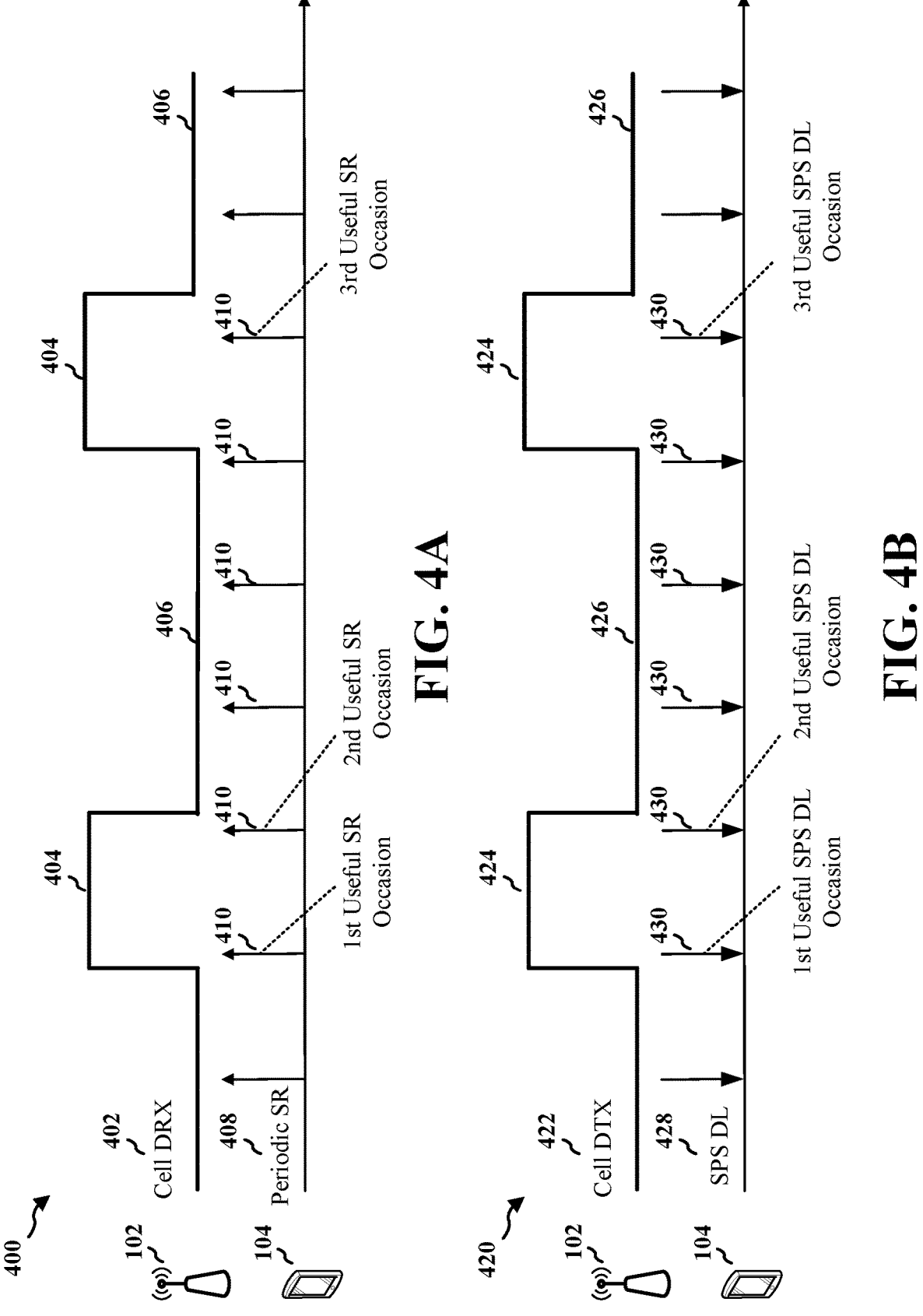
FIGS. 4A-4B are diagrams illustrating examples of cell discontinuous reception (DRX) and cell discontinuous (DTX) operation, with FIG. 4A demonstrating the misalignment of scheduling request (SR) occasions with cell DRX on durations, and FIG. 4B showing the misalignment of semi-persistent scheduling (SPS) occasions with cell DTX on durations.

FIG. 4A-4B depict examples 400, 420 of cell DRX and DTX operations. Both cell DRX and DTX involve a duty cycle 402, 422 for reception and transmission, respectively. During an active time or on duration 404, 424 of the duty cycle, the network functions normally, engaging in data reception and transmission, respectively. In contrast, during the inactive time or off duration 406, 426, the network either ceases data reception and transmission, or imposes restrictions on these activities. This duty cycle approach contributes to energy savings at the network site. For instance, by consolidating transmissions within the active interval or on durations 404, 424, the network may enter a sleep mode during the inactive time or off durations 406, 426, resulting in energy conservation.

Consequently, cell DTX or DRX techniques may be employed to conserve energy in both base stations and UEs by minimizing transmission and reception activities during non-active periods. Moreover, when both cell DRX and DTX are employed, network energy savings may be achieved by synchronizing transmission activities in cell DTX with reception activities in cell DRX. For instance, specific modules of a wireless transceiver of a base station, such as high-speed clocks and baseband modules, may be powered down when both transmission and reception activities are inactive, resulting in further power-saving gains.

Furthermore, as wireless network generations advance, such as with 6G and beyond, networks are anticipated to experience higher data rates, increased numbers of connected devices, and greater energy consumption. Consequently, efficient energy-saving techniques are of primary importance for maintaining the sustainability and performance of 6G networks. Various approaches may be considered to enhance energy-saving techniques and make them more effective for future wireless networks. One approach involves dynamic activation and deactivation of cell DTX/DRX, which allows the network to adapt its energy-saving techniques based on real-time network conditions and traffic demands. Another approach involves merging dynamic antenna adaptation with cell DTX/DRX, which combines the energy-saving benefits of cell DTX/DRX with the ability to adjust the antenna configuration based on network conditions. Such approaches aim to make energy-saving techniques more efficient, dynamic, and adaptable to network conditions, ensuring better network performance and sustainability.

Energy conservation in wireless networks may also be achieved by applying constraints to downlink transmissions and uplink transmissions during non-active periods of cell DTX or cell DRX, respectively. This involves identifying specific signals and channels for connected mode UEs that may not be transmitted or received during the non-active periods of cell DTX and DRX. An example set of downlink (DL) signals and channels that may be restricted from cell DTX off durations includes periodic/semi-persistent CSI-RSs, tracking reference signals (TRS), positioning reference signals (PRS), PDCCH scrambled with a UE-specific radio network temporary identifier (RNTI), PDCCH in a Type-3 common search space (CSS), and semi-persistently scheduled (SPS) PDSCH. An example set of uplink (UL) signals and channels that may be restricted from cell DRX off durations includes scheduling requests (SRs), periodic/semi-persistent CSI reports, periodic/semi-persistent sounding reference signals (SRSs), and configured grant physical uplink shared channel (CG-PUSCH). These examples of DL and UL signals and channels which may not be transmitted or received during downlink and uplink non-active periods of cell DTX or DRX are not exhaustive, and other signals and channels may also be considered for restriction where appropriate. Thus, by deactivating suitable sets of signals and channels from transmission or reception during non-active periods, energy savings in 5G networks may be maximized while maintaining network performance and user experience.

However, applying such constraints during non-active periods of cell DRX or cell DTX may present challenges for UEs related to periodic or semi-persistent signal transmissions or receptions. As previously described, a UE may be configured with multiple periodic signals/channels for various purposes in both UL and DL directions, serving different functions in the communication between the UE and the base station. For example, in the DL direction, the UE may be configured with periodic/semi-persistent CSI-RS including semi-persistently scheduled TRS, and in the UL direction, the UE may be configured with periodic SRs, periodic/semi-persistent CSI reports, periodic/semi-persistent SRSs, or CG-PUSCH. When such periodic or SPS signals or channels are restricted from being transmitted or received during non-active periods of cell DTX or DRX, then the cell DRX/DTX-independent nature of the signal configuration may affect the UE's ability to effectively transmit and receive these signals/channels during cell DRX or DTX operations. For example, if a UE is configured with periodic SR occasions in which the UE may send periodic SRs to the base station, some of these SR occasions may be unusable for SRs due to the limitation of UE's transmission and reception activities to specific time intervals in cell DRX or DTX operation (the on durations). That is, due to potential misalignment of the UE's scheduled, periodic or SPS transmission occasions and the base station's active reception or transmission periods in cell DRX or DTX respectively, some of the scheduled occasions may happen to occur during the cell DRX or DTX off duration, resulting in the UE's signals not being able to be received by the gNB or the gNB's signals not being able to be transmitted to the UE in these occasions despite their having been scheduled. This may lead to inefficient communication and potential performance degradation.

For instance, referring back to the examples 400, 420 of FIGS. 4A and 4B, base station 102 may provide UE 104 a periodic SR configuration 408 or SPS DL configuration 428 respectively scheduling periodic SR occasions 410 or periodic SPS occasions 430 in which the UE may correspondingly transmit scheduling requests or receive SPS DL data. However, since these periodic signal configurations are configured independently of cell DRX or cell DTX operation, misaligned transmission occasions with cell active durations may result. For instance, in the example 400 of FIG. 4A, while duty cycles 402 configured for cell DRX may include on durations 404 and off durations 406 operating according to a specific pattern, the SR occasions 410 are configured periodically regardless of the timing of the on duration 404 or the off duration 406, leading to scheduled SR occasions during off durations 406 notwithstanding the aforementioned restrictions on transmission of SRs during the inactive time. Similarly, in the example 420 of FIG. 4B, the SPS occasions 430 may likewise be configured regardless of the timing of the on duration 424 or off duration 426 of duty cycles 422 configured for cell DTX, leading to scheduled SPS occasions overlapping with the off durations

426 notwithstanding the aforementioned restrictions on transmission of SPS DL data during the inactive time.

Consequently, due to the misalignment between the periodicities of cell DRX active times and configured SR occasions, or the misalignment between the periodicities of cell DTX active times and the SPS DL occasions, a limited number of configured occasions may occur during the active time of cell DRX or DTX which are thus actually useful to the UE. Moreover, non-uniformity of scheduled transmission occasions during cell DRX or DTX active times may result. For instance, as illustrated in example 400 of FIG. 4A, there may be two SR occasions 410 scheduled during the first (left) cell DRX on duration which are usable for SR transmissions, as opposed to one SR occasion scheduled during the second (right) cell DRX on duration which is usable for SR transmissions. Moreover, in the first cell DRX on duration having two useful SR occasions, the second SR occasion may be less usable for the UE than the first SR occasion, due to the second occasion happening to have been scheduled closer to the end of the cell DRX on duration. Similarly, as shown in example 420 of FIG. 4B, there may be two SPS occasions 430 of varied useability scheduled during the first cell DTX on duration, as opposed to one SPS occasion 430 during the second cell DTX on duration. Such misalignment between on duration periodicities and transmission occasion periodicities may lead to suboptimal utilization of periodic or SPS occasions during the active times of cell DRX or cell DTX.

Thus, when periodic or semi-persistently scheduled signals such as SRs, SPS DL, configured grants, and the like are not configured to align with the cell DTX or DRX configurations, it may lead to poor network performance and high latency in transmitting signals. For instance, when periodic/SPS signals and cell DRX configurations are set separately, both having their own configurations and timing offsets independent of the other, it could result in long waiting times to find a validly scheduled occasion for transmission. The lack of coordination between the transmission and reception of such signals/channels in relation to cell DRX/DTX cycles may also lead to undesirable variations in outcomes depending on the specific timing at issue. For instance, there might be occasions for transmission during some active times of cell DRX or cell DTX, while at other times, there may be no occasions for transmission. If the cell DRX/DTX on duration is significantly misaligned with periodic or SPS transmission occasions, there may not even be any occasions usable for transmission. Moreover, non-uniform scheduling opportunities for the UE may result in increased latency, as the number of transmission occasions may vary between overlap cycles and cause further delays in the UE's ability to communicate with the gNB. That is, increased latency due to transmission occasion misalignment with cell DRX/DTX may be experienced not only across cell DRX/DTX cycles but also within cell DRX/DTX cycles, such as illustrated in the first on duration 404, 424 of FIGS. 4A-4B. For example, in the example of FIG. 4A, although the first SR occasion 410 at the beginning of the first on duration 404 may allow the BS 102 sufficient time to respond to an SR and allow the UE to react to a network response within the same cell DRX cycle 402, this efficiency may not be possible for the second SR occasion 410 occurring at the end of the first on duration 404 in the cell DRX cycle 402. While the UE 104 or base station 102 may attempt to compensate for this increased latency per cell DRX/DTX cycle due to misalignment by increasing the periodicity of its transmissions within a given on duration, this approach may result in further inefficiencies since it may overlook current DL or UL traffic requirements and lead to overloading of resources at the UE 104 or the base station 102.

Therefore, since misaligned configurations of periodic or semi-persistently scheduled signals with cell DRX/DTX may lead to poor network performance and high latency in transmitting signals, it is important to align UE transmission and reception activities with a base station's active periods during cell DRX/DTX operations so that efficient communication, network energy-saving, and improved network performance may be achieved. To this end, aspects of the present disclosure introduce a periodic/semi-persistent signal/channel configuration that considers cell DRX/DTX operation. This configuration may not only align signal or channel occasions with cell DRX or DTX cycles but also provide uniform scheduling opportunities across multiple cell DRX or DTX cycles. As a result, the network may enhance periodic or SPS communication efficiency, reduce latency, and facilitate energy savings through cell DRX or DTX, ultimately improving overall network performance.

In one aspect, to avoid misalignment of signal or channel occasions with cell DTX or DRX configurations, the network may establish periodic or SPS signals or channels in relation to a cell DTX cycle or cell DRX cycle. Specifically, the base station may configure periodicity and offset information associated with the cell DRX cycle or cell DTX cycle within the signal or channel configuration of an SR, SPS PDSCH, CG PUSCH, SRS, or other periodic or SPS signal or channel. In one example, the base station may configure an offset that indicates the initial communication start time of the signal or channel during a cell DRX or DTX cycle. The offset may be specified in various units, such as symbols, slots, frames, or seconds. The offset may be configured with a value with respect to a start time or other reference time of a given cell DTX/DRX cycle such that the periodic or SPS signals/channels begin transmission within an on duration of the given cycle, thus enhancing communication efficiency. In another example, the base station may configure a periodicity T for the signal or channel, indicating the time interval between consecutive occurrences of the signal or channel during the on duration of the cell DRX or DTX cycle. Similar to the offset, the period may be specified in different units, such as symbols, slots, frames, or seconds. The periodic value T may be configured such that the signals/channels are transmitted or received at regular intervals within an active time of the cell DRX/DTX cycle, maintaining consistent scheduling opportunities for the UE. By configuring periodicity and offset information of a periodic or SPS signal or channel with respect to a cell DTX cycle or cell DRX cycle in this manner, this approach may result in alignment between the UE's transmission and reception activities and the gNB's active periods of cell DRX/DTX, maintaining network energy savings and improving overall network performance.

Figures 5A, 5B:
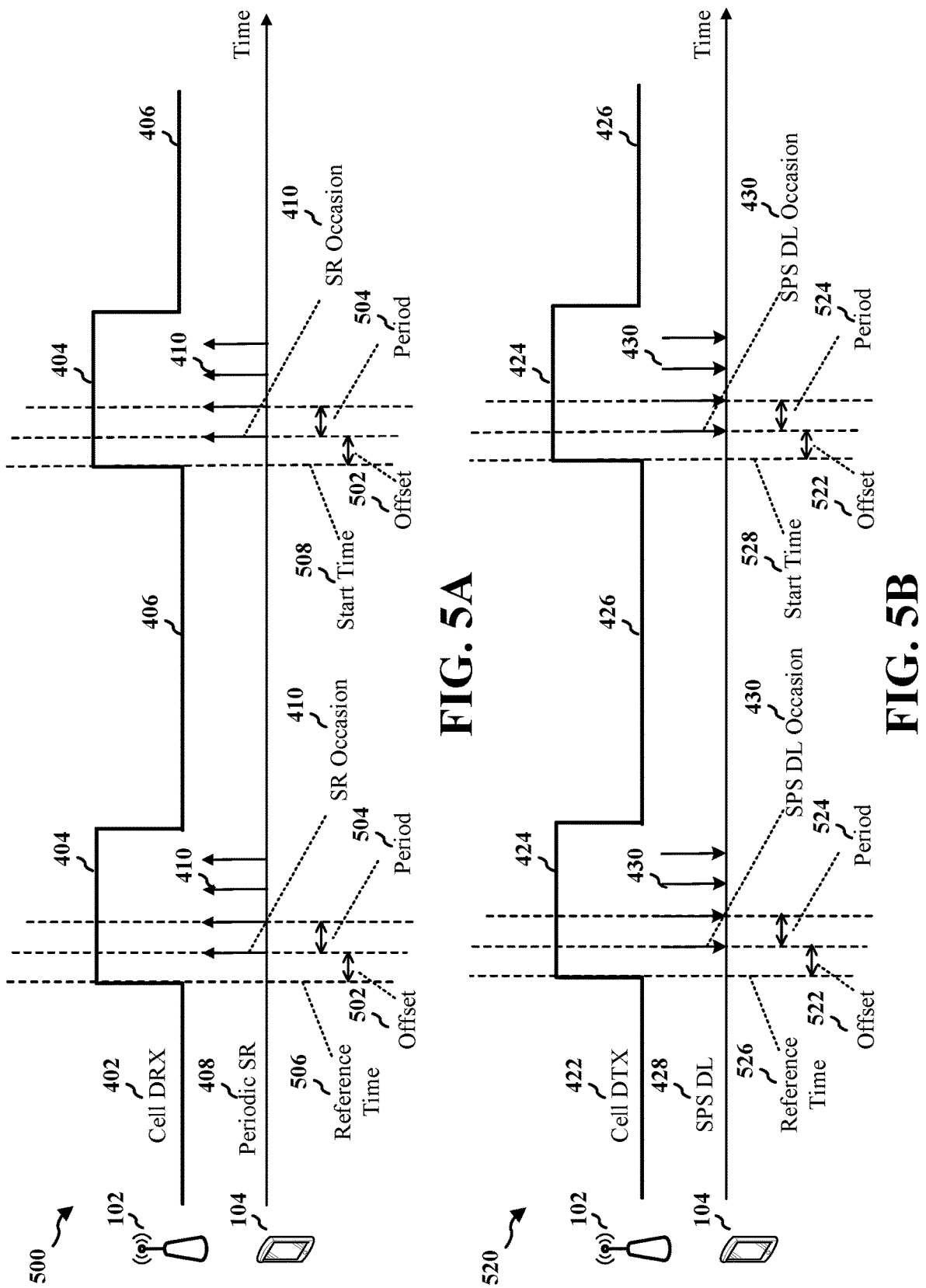
FIGS. 5A-5B are diagrams illustrating examples of signal configurations defined with respect to cell DRX and DTX cycles, where

FIGS. 5A-5B illustrate examples 500, 520 of signal or channel configurations defined with respect to cell DRX or cell DTX. In particular, FIG. 5A illustrates the example 500 of periodic SR configuration 408 including an offset 502 and a periodicity 504 defined with respect to cell DRX cycle 402 for periodic SR occasions 410, while FIG. 5B illustrates the example 520 of SPS DL configuration 428 including an offset 522 and a periodicity 524 defined with respect to cell DTX cycle 422 for periodic SPS occasions 430. In these examples, the base station 102 may provide UE 104 with a cell DRX configuration and cell DTX configuration respectively and separately from the signal or channel configuration for the SR occasions 410 or SPS DL occasions 430. The cell DRX or cell DTX configuration may respectively configure cell DRX cycles 402 or cell DTX cycles 422 including off durations 406, 426, during which the base station 102 is in a low-energy state and not actively monitoring the network, and on durations 404, 424, during which the base station 102 is actively monitoring the network. The cell DRX cycles 402 or cell DTX cycles 422 may occur periodically, and the periodic SR occasions 410 or periodic SPS occasions 430 configured in the signal or channel configuration may correspondingly occur in the on durations 404, 424 of these respective cycles.

In the examples 500, 520 of FIGS. 5A and 5B, the base station 102 may configure the timing of transmission occasions indicated in the signal or channel configuration to begin at a time offset with respect to a reference time 506, 526 associated with the cell DRX cycle 402 or cell DTX cycle 422. The reference time 506, 526 may be for example, a start time 508, 528 of the on duration 404, 424 of the cell DRX cycle 402 or cell DTX cycle 422, or an offset or shifted time from the start time 508, 528 of the cell DRX/DTX cycle. The reference time 506, 526 may be preconfigured, indicated in a cell DRX or cell DTX configuration, or indicated in the signal or channel configuration. Thus, the reference time 506, 526 may be a time associated with the cell DRX cycle 402 or cell DTX cycle 422, as opposed to a time independent of the cell DRX cycle 402 or cell DTX cycle 422 such as, for example, the beginning of a frame or slot not relative to cell DRX/DTX cycle 402, 422. For instance, in the example 500 of FIG. 5A, the base station 102 may configure the offset 502 in the periodic SR configuration 408 with respect to reference time 506 that is the start time 508 of the cell DRX on duration 404, while in the example 520 of FIG. 5B, the base station 102 may configure the offset 522 in the SPS DL configuration 428 with respect to the reference time 526 that is the start time 528 of the cell DTX on duration 424. Alternatively, in either example 500, 520, the base station 102 may configure the offset 502, 522 with respect to reference time 506, 526 that is either positively or negatively shifted with respect to the start time 508, 528 of the cell DRX or DTX on duration 404, 424, such as an end time of a current or previous cell DRX or DTX on duration, or an intermediate time between the start time and end time of a current cell DRX or DTX on duration. While in the illustrated examples 500, 520, the offset 502, 522 in the signal configuration is configured to be a non-zero value and thus occurs after the start time 508, 528 or reference time 506, 526, in other examples the offset 502, 522 may be configured with a zero value and thus aligned with the start time 508, 528 or reference time 506, 526. In either example, the initial SR occasion 410 or initial SPS DL occasion 430 may thus be aligned with the respective time offset 502, 522 within the associated cell on duration 404, 424, providing more efficient transmissions than those otherwise available in typical cell DTX or DRX configurations.

Similarly, the base station 102 may configure the periodicity 504, 524 of transmission occasions in the signal or channel configuration, such as the periodic SR configuration 408 of FIG. 5A or SPS DL configuration 428 of FIG. 5B, to occur within the active time of the cell DRX cycle 402 or cell DTX cycle 422. For instance, the base station 102 may configure a periodicity T of the SR occasions 410 or SPS DL occasions 430 to be less than the duration of the respectively associated, cell DRX on duration 404 or the cell DTX on duration 424, with the value T of the periodicity 504, 524 being higher or lower based on current traffic requirements. Thus, in the example 500 of FIG. 5A, one or more subsequent SR occasions 410 may be configured to follow the initial SR occasion 410 within the on duration 404 of the cell DRX cycle 402 at respective periods defined by the value of periodicity 504 in the SR configuration, and in the example 520 of FIG. 5B, one or more subsequent SPS occasions 430 may be configured to follow the initial SPS occasion 430 within the on duration 424 of the cell DTX cycle 422 at respective periods defined by the value of periodicity 524 in the SPS configuration. The periodicity 504, 524 may be configured with a lower value in large traffic scenarios such that more subsequent occasions 410, 430 occur within a single active on duration of cell DRX/DTX cycle 402, 422, or the periodicity 504, 524 may be configured with a higher value in small traffic scenarios such that less subsequent occasions 410, 430 occur within a single active on duration of cell DRX/DTX cycle 402, 422.

The configuration of periodic occasions 410, 430 for a signal or channel may apply for multiple on durations of cell DRX or cell DTX, respectively. Thus, for each on duration 404, 424 of cell DRX cycle 402 or cell DTX cycle 422, the base station 102 may configure initial and subsequent SR occasions 410 or SPS occasions 430 to periodically occur within the respective on durations 404, 424. These transmission occasions in subsequent on durations may similarly occur at respectively defined periodicities 504, 524 beginning at the time of the configured offset 502, 522 with respect to the on duration start time 508, 528 or other reference time 506, 526 associated with each cell DRX/DTX cycle 402, 422.

In another aspect, when the base station 102 configures periodic occasions for a signal or channel in the signal or channel configuration, such as the SR configuration 408 of FIG. 5A or the SPS configuration 428 of FIG. 5B, the occasions may be defined within an active time of a cell DRX or DTX cycle using different approaches. In a first approach, the base station 102 may configure the transmission occasions 410, 430 to include all valid occasions starting at the configured offset 502, 522 and occurring within the cell DRX or DTX cycle 402, 422. For example, when the base station 102 defines the periodicity and offset information in the signal or channel configuration with respect to the cell DRX or DTX cycle 402, 422 such as previously described with respect to FIGS. 5A and 5B, all the transmission occasions 410, 430 that resultingly fall within the active time of the cell DRX or DTX cycle 402, 422 may be applied for transmission of the signal or channel, excluding those occasions 410, 430 which are invalid for the associated signal or channel (such as uplink slots for downlink signals or vice-versa). For instance, if the periodicity and offset information is configured such that four valid transmission occasions 410, 430 for signals or channels fall within a single, cell DRX or cell DTX on duration 404, 424 such as illustrated in the examples 500, 520 of FIGS. 5A and 5B, the UE 104 or base station 102 may transmit data accordingly in all four of these occasions 410, 430.

In a second approach, the base station 102 may configure the transmission occasions to include a specified or configured number X of valid, consecutive occasions starting at the configured offset 502, 522 and repeating according to the configured periodicity 504, 524 T within the cell DRX or DTX cycle 402, 422. For example, the base station 102 may select a value of X to be less than or equal to the number of valid transmission occasions that are expected to fall within the on duration 404, 424 of the cell DRX or cell DTX cycle 402, 422, and the base station 102 may provide an indication of the selected number X through an RRC configuration, a MAC-CE, a DCI, or other signaling to the UE 104. The configuration including the selected value of X may be a different configuration or message than the signal or channel configuration, or the selected value of X may be in the same configuration or message as the signal or channel configuration. As a result, when the base station 102 defines the periodicity and offset information in the signal or channel configuration with respect to a cell DRX or DTX cycle such as previously described with respect to FIGS. 5A and 5B, X consecutive, transmission occasions 410, 430 that resultingly fall within the active time of the cell DRX or DTX cycle 402, 422 may be applied for transmission of the signal or channel, excluding those occasions 410, 430 which are invalid for the associated signal or channel (such as downlink slots for uplink signals or vice-versa). For instance, if the periodicity and offset information is configured such that four valid, transmission occasions 410, 430 for signals or channels fall within a single cell DRX or cell DTX on duration 404, 424 such as illustrated in FIGS. 5A and 5B, but the base station 102 configures the value of X to be three, the UE 104 or base station 102 may transmit data accordingly in the first three consecutive occasions of the four occasions 410, 430 while refraining from transmitting data in the fourth occasion.

Thus, while the first approach provides flexibility in allowing the UE 104 to communicate efficiently with the base station 102 in all valid occasions for transmission during the cell DRX or DTX cycle 402, 422, the second approach provides more dynamic and precise control in the scheduling or use of transmission occasions 410, 430. For example, the base station 102 may dynamically select the value of X to increase or decrease the number of consecutive valid occasions for transmission during a cell DRX or DTX cycle based on current network conditions or traffic demands. Additionally, for further dynamic select ability, the selected value of X may be selected in a MAC-CE or DCI from a previously configured or activated set of values of X in an RRC configuration or a MAC-CE, respectively.

In a further aspect, when the base station 102 configures semi-persistent signals or channels with respect to a cell DRX or DTX cycle such as cell DRX/DTX cycle 402, 422, the signal or channel configuration may be associated with an activation of the semi-persistent signal or channel. For instance, in addition to configuring the offset 502 and periodicity 504 of the signal or channel in the signal or channel configuration such as previously described with respect to FIGS. 5A-5B, the base station 102 may configure a number of transmission occasions since activation of the signal or channel. The number of transmission occasions available for SPS transmissions since activation may be configured with respect to a single cell DRX or DTX cycle 402, 422 or with respect to multiple cell DRX or DTX cycles. In the single cycle example, the configured number of transmission occasions since activation may be the same as, or configured in a same or similar manner as, the specified or configured number X of valid, consecutive occasions starting at the configured offset 502 and repeating according to the configured periodicity 504 T within cell DRX or DTX cycle 402, 422. Alternatively, in the multiple cycle example, the configured number of transmission occasions since activation may encompass all valid transmission occasions within a given cell DRX or DTX cycle over a certain number of cell DRX or DTX cycles in total.

Thus, transmission in the occasions may be configured in a same or similar manner as described with respect to FIGS. 5A-5B in either the first or second approaches above, but here additionally in response to activation of the occasions for SPS signals or channels. However, since the base station 102 may perform this activation via transmission of a DCI or other signal activating the SPS signal or channel occasions, the validity of the occasions may further depend on the timing of the activation signal. For example, if the base station transmits the DCI or other activation signal during the cell DRX or DTX on duration 404, 424 prior to the configured time offset 502 for an initial SPS signal or channel occasion, all the activated occasions within the on duration 404 and in subsequent on durations 404 may consequently be valid. Thus, the UE 104 or base station 102 may begin transmitting data in the activated occasions according to the configured periodicity and offset information during cell DRX or DTX on durations 404, 424 such as previously described. In contrast, if the base station 102 transmits the DCI or other activation signal during the cell DRX or DTX on duration 404, 424 after the configured time offset 502 for a SPS signal or channel occasion, then the activated occasions occurring after transmission or reception of the activation signal may consequently be valid but not the configured occasions occurring prior to the activation. As a result, the UE 104 or base station 102 may begin transmitting the SPS signal or channel at the next available or valid occasion following the activation signal within the on duration 404, 424 of the cell DRX or DTX cycle 402, 422 while continuing to transmit data in subsequent occasions and cell DRX or DTX on durations 404, 424 in accordance with the periodicity and offset information. Thus, the signal or channel configuration may consider SPS activation when aligning SPS transmissions within cell DRX or DTX cycles 402, 422, thereby improving communication efficiency and energy-saving in wireless networks for SPS signals and channels.

Figure 6:
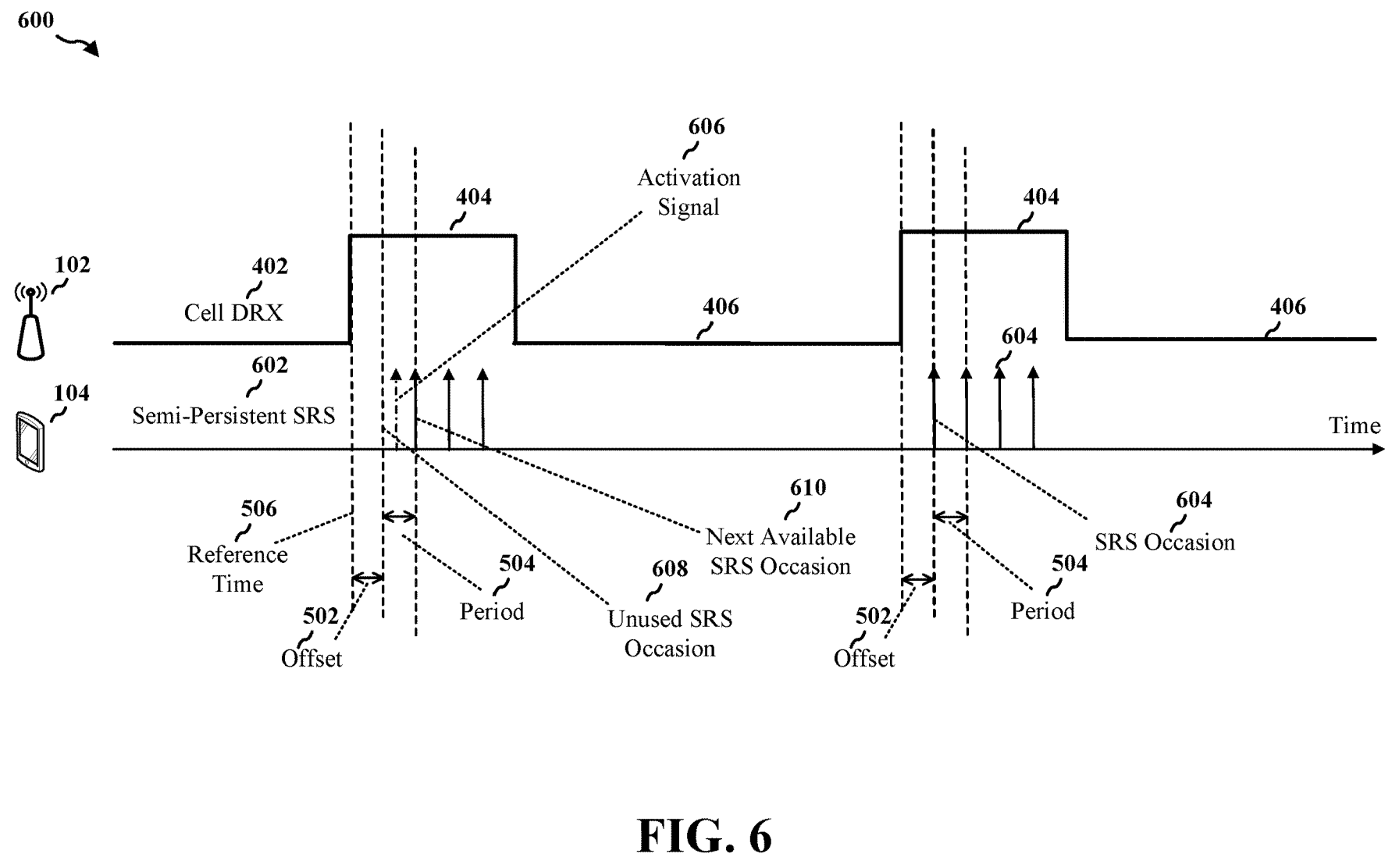

FIG. 6 illustrates an example 600 of a signal or channel configuration defined with respect to cell DRX. In particular, FIG. 6 illustrates the example 600 of a semi-persistent SRS configuration 602 including offset 502 and periodicity 504 defined with respect to cell DRX cycle 402 for SPS SRS occasions 604, as well as a number of transmission occasions since activation of SPS SRS. While this example and the concepts which follow specifically refer to SRS and cell DRX, it should be understood that these concepts may similarly apply to other SPS UL transmissions in cell DRX, as well as to SPS DL transmissions in cell DTX.

In the example 600 of FIG. 6, the signal or channel configuration and the cell DRX configuration may be performed in a same or similar manner to that described with respect to FIGS. 5A and 5B. For example, here the UE 104 may be similarly provided with a cell DRX configuration separately from the signal or channel configuration which may configure cell DRX cycles 402 including off durations 406 and on durations 404 occurring periodically, the base station 102 may similarly configure the timing of transmission occasions 604 in the signal or channel configuration to begin at the offset 502 with respect to reference time 506 associated with the cell DRX cycle 402, and the base station 102 may similarly configure the periodicity 504 of transmission occasions in the signal or channel configuration to occur within the active time or on duration 404 of the cell DRX cycle. Likewise, the base station 102 may configure the transmission occasions 604 to either include all valid occasions starting at the configured offset 502 and occurring within the cell DRX cycle 402, or to include a specified or configured number of valid, consecutive occasions starting at the configured offset 502 and repeating according to the configured periodicity 504 T within the cell DRX cycle 402.

Following configuration of the SPS SRS occasions 604 and cell DRX cycle 402 in this example 600, the base station 102 may transmit and the UE 104 may receive an activation signal 606 for the SPS SRS occasions 604, such as a DCI activating the SPS SRS for the configured number of occasions. In this example, the activation signal 606 is received after the configured time offset 502 during the first cell DRX cycle 402 for the initial SRS occasion 604. As a result, since SRS occasions 608 occurring prior to the time of reception of activation signal 606 are not activated and thus invalid to use for transmission, the UE 104 instead begins transmitting the SPS SRS at a next available occasion 610 following the activation signal 606. For example, as illustrated in FIG. 6, the UE 104 may refrain from transmitting the SRS in the initial SRS occasion 608 and start transmission of SRS in the next subsequent SRS occasion 610. Afterwards, the UE 104 may continue to transmit SPS SRS according to the configured periodicity and offset information in occasions for the SPS SRS up to the configured number of transmission occasions since activation of the SPS SRS. For example, the UE 104 may proceed to transmit SPS SRS in further subsequent SRS occasions 604, within the same cell DRX cycle 402 and possibly later in subsequent cell DRX cycles 402, while the SPS SRS remains activated.

Accordingly, by aligning and uniformly distributing periodic or SPS signal or channel transmission occasions within active periods of cell DRX or DTX, latency may be reduced and communication efficiency improved. For instance, as illustrated in FIGS. 5A-5B or FIG. 6, configuring the periodicity and offset information with respect to a cell DRX or cell DTX cycle allows the base station to provide a specific number of uniformly distributed occasions for transmission at respective active times. This configuration may result in better network performance compared to other configurations such as those shown in FIGS. 4A-4B, which include unaligned and non-uniform numbers of occasions across active times. Additionally, allowing the base station to configure the periodicity and offset information in the signal or channel configuration based on the current traffic pattern observed by the network helps avoid resource overloading and transmission occasion misalignment. While the examples above specifically refer to SRs, SPS DL transmissions, and SPS SRS transmissions, it should be understood that these examples may also apply to other uplink or downlink transmissions of signals or channels that are restricted from transmission during downlink and uplink non-active periods of cell DTX or DRX cycles. Moreover, efficient alignment of SPS signals following activation may be achieved through the signal or channel configuration, as well as uniformity maintained of a certain number of valid transmission occasions across multiple cell DRX or DTX cycles.

Figure 7:
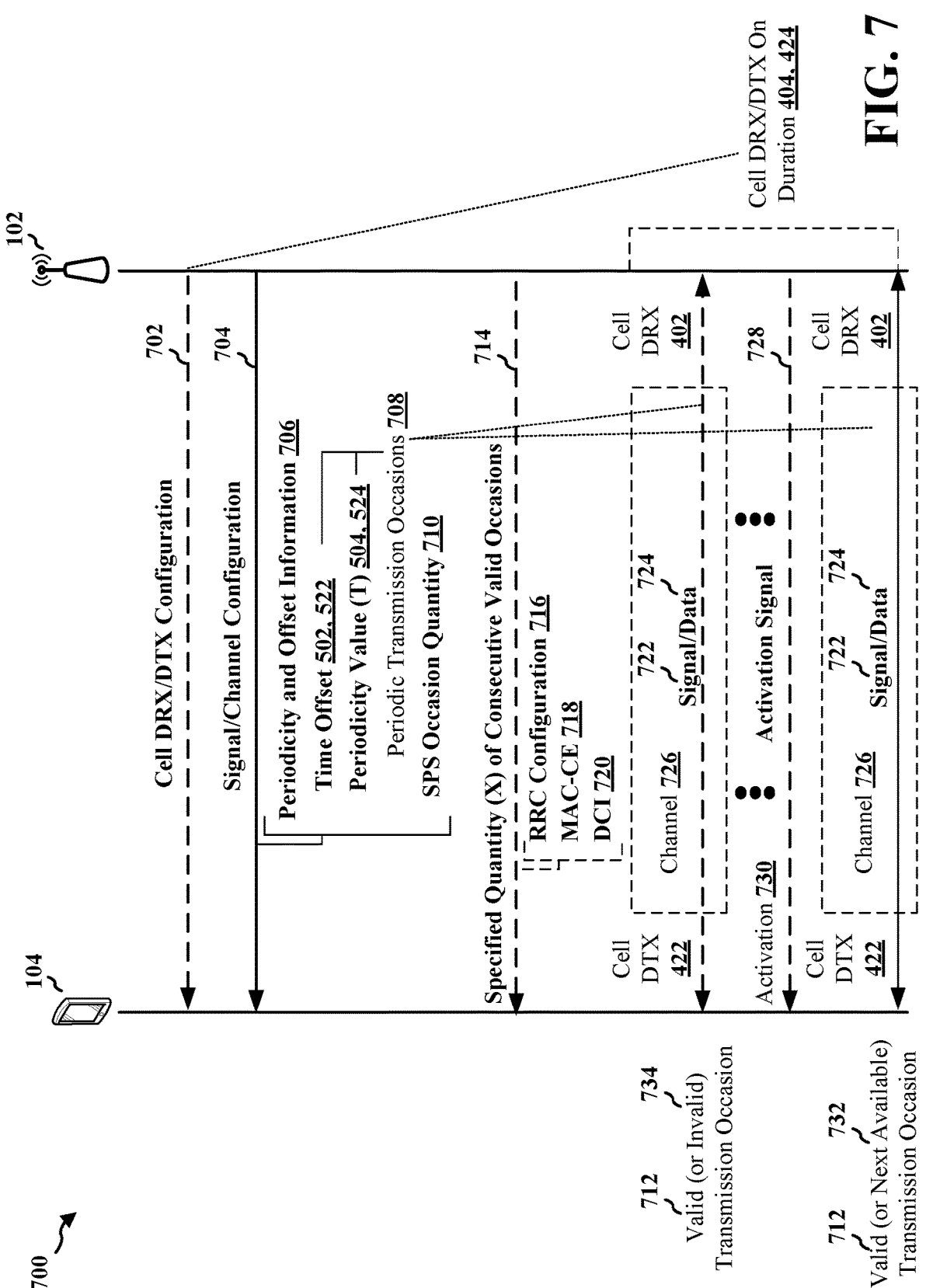
FIG. 7 is a call flow diagram between a UE and a base station.

FIG. 7 is a diagram 700 illustrating a call flow between UE 104 and base station 102. Initially, the base station 102 transmits a cell DRX/DTX configuration 702 to the UE 104. The cell DRX configuration or cell DTX configuration may configure respective on durations 404, 424 and off durations 406, 426 in cell DRX or DTX cycles 402, 422 of base station 102. For example, referring to FIGS. 4A-4B, the cell DRX configuration may include parameters for cell DRX cycles 402 indicating on durations 404 and off durations 406 for network reception activity and inactivity respectively, while the cell DTX configuration may include parameters for cell DTX cycles 422 indicating on durations 424 and off durations 426 for network transmission activity and inactivity, respectively.

Afterwards, the base station 102 transmits a signal/channel configuration 704 to the UE 104. The signal or channel configuration may include periodicity and offset information 706 for periodic signals or semi-persistently scheduled signals. The periodicity and offset information 706 may indicate time offset 502 and the value T of periodicity 504 for periodic transmission occasions 708 of downlink or uplink signals or channels. For example, referring to FIGS. 5A-5B, the signal/channel configuration may include the periodicity and offset information indicating the timing of periodic SR occasions 410 or SPS DL occasions 430 within cell DRX cycle 402 or cell DTX cycle 422. In some examples where the signal or channel configuration is for an SPS signal, the signal/channel configuration may further indicate a quantity 710 of SPS occasions following their activation. For example, referring to FIG. 6, the signal configuration may include a quantity of SPS SRS occasions 604 configured with respect to cell DRX cycle 402 as valid occasions for transmission following activation of these occasions in response to activation signal 606. The base station 102 may configure the periodicity and offset information 706 with respect to a reference time associated with the cell DRX/DTX cycle 402, 422 such that the periodic transmission occasions 708 are aligned within the on durations 404, 424 of respective cell DRX or DTX cycles 402, 422. For example, referring to FIGS. 5A-5B, the base station 102 may configure the periodicity and offset information to align SR occasions 410 or SPS DL occasions 430 within the on durations 404, 424 of cell DRX cycle 402 or cell DTX cycle 422 beginning with respect to reference time 506, 526 associated with single or multiple cycles.

In one example, the periodic transmission occasions 708 may include all consecutive, valid transmission occasions 712 that are scheduled according to the periodicity and offset information 706 within the cell DRX/DTX on duration 404, 424. For instance, referring to the first approach described with respect to FIGS. 5A-5B, the base station 102 may configure all the transmission occasions 410, 430 for SR or SPS DL occurring within the cell DRX cycle 402 or cell DTX cycle 422 at the specified periodicity 504, 524 and offset 502, 522 as valid occasions for transmission or reception. In another example, separate from or in the same configuration as the signal/channel configuration, the base station 102 may transmit an indication of a specified quantity 714 X of consecutive valid occasions 712 of the periodic transmission occasions 708 in which the UE 104 may transmit or receive periodic or SPS signals or data in channels according to the periodicity and offset information 706. For instance, referring to the second approach of FIGS. 5A-5B, the base station 102 may configure a specified number (not necessarily all but may be at most all) of the transmission occasions 410, 430 for SR or SPS DL occurring within the cell DRX cycle 402 or cell DTX cycle 422 at the specified periodicity 504, 524 and offset 502, 522 as valid occasions for transmission or reception. The specified quantity 714 or number of times of the consecutive valid occasions 712 may be indicated in an RRC configuration 716, a MAC-CE 718, or a DCI 720.

After receiving the cell DRX/DTX configuration 702 and signal/channel configuration 704 from the base station 102, the UE 104 may communicate signals 722 or data 724 in channels 726 with the base station 102 during consecutive, valid transmission occasions 712 of periodic transmission occasions 708 within respectively configured, cell DRX/DTX on durations 404, 424. Thus, the UE 104 and base station 102 may communicate the signals 722 or data 724 in the channels 726 according to the periodicity and offset information 706. For instance, referring to FIGS. 5A, 5B, and 6, the UE 104 and base station 102 may communicate SRs, SPS DL data, or SPS SRS respectively in valid consecutive, SR occasions 410, SPS PDSCH occasions 430, or SPS SRS occasions 604 within cell DRX cycle 402 or cell DTX cycle 422 according to the configured periodicity 504, 524 and offset 502, 522 for those signals or channels. The signals 722 or channels 726 may be one or more of various downlink or uplink signals or channels that are configured to be restricted from transmission or reception during cell DRX/DTX off durations 406, 426. For example, these signals 722 or channels 726 may include, but are not limited to, CSI-RS, PRS, PDCCH, SPS PDSCH, SR, CSI report, SRS, or PUSCH.

In some examples where the signal or channel configuration is for an SPS signal, the base station 102 may transmit an activation signal 728 such as a DCI to the UE 104. The activation signal 728 may activate a number of the periodic transmission occasions 708, such as that specified by SPS occasion quantity 710, which are scheduled according to the periodicity and offset information 706. Following their activation 730 in response to activation signal 728, these occasions 708 may become valid for transmission or reception of the semi-persistently scheduled, signal 722 or data 724 in the channel 726.

In one example, if the base station 102 transmits or the UE 104 receives the activation signal 728 after the scheduled timing of one or more of these periodic transmission occasions 708, then the UE 104 may communicate the signal 722 or data 724 in channel 726 with the base station 102 beginning in a next available transmission occasion 732 following the timing of the activation 730 within the cell DRX/DTX on duration 404, 424. Thus, the UE 104 and base station 102 may refrain from such communication in invalid transmission occasions 734 preceding the activation 730. For example, referring to FIG. 6, the UE 104 may transmit SPS SRS in SRS occasions 604 to the base station 102 scheduled according to the periodicity 504 and offset 502 beginning with the next available transmission occasion 610 following reception of the activation signal 606, and the UE may skip transmission of SPS SRS in the invalid SRS occasion 608 preceding the activation signal 606.

FIG. 8 is a flowchart 800 of a method of wireless communication. The method may be performed by a UE or one or more of its components, for example, the UE 104, 350; one or more of RX processor(s) 356, TX processor(s) 368, or controller(s)/processor(s) 359; the apparatus 1002; or cellular baseband processor(s) 1004 or its components. The method allows a UE to communicate periodic and semi-persistent signals or channels in aligned periodic transmission occasions within cell DRX cycles or cell DTX cycles to improve communication efficiency and energy-saving in wireless networks. Optional aspects are illustrated in dashed lines.

At block 802, the UE may obtain, from a network entity, a signal configuration indicating periodicity and offset information for a signal or a channel. For example, 802 may be performed by signal configuration component 1040. For instance, referring to FIGS. 5A, 5B, 6, and 7, the UE 104 may obtain a signal configuration, such as signal/channel configuration 704, from a network entity such as base station 102, for signal 722 or channel 726. The signal configuration may include periodicity and offset information 706 for periodic transmission occasions 708 such as, but not limited to, SR occasions 410, SPS DL occasions 430, or SPS SRS occasions 604. Obtaining the signal configuration may include, for example, receiving, demodulating, and decoding an encoded and modulated signal including the signal configuration using at least one or more of RX processor(s) 356 or controller(s)/processor(s) 359 such as described with respect to UE 350 in FIG. 3.

The periodicity and offset information is configured to align periodic transmission occasions of the signal or the channel within an on duration of a cell DRX cycle or a cell DTX cycle beginning with respect to a reference time associated with the cell DRX cycle or the cell DTX cycle. For instance, referring to FIGS. 5A, 5B, 6, and 7, the periodicity and offset information 706 may align periodic transmission occasions 708, such as SR occasions 410, SPS DL occasions 430, or SPS SRS occasions 604 within the on durations 404, 424 of cell DRX cycle 402 or cell DTX cycle 422, beginning with respect to reference time 506, 526 associated with the cell DRX cycle 402 or the cell DTX cycle 422. For example, to align the transmission occasions 708 within the on durations, the periodicity and offset information 706 may specify the timing at which these occasions 708 periodically begin to occur with respect to the reference time 506, 526 associated with the cell DRX cycle 402 or cell DTX cycle 422, and the time intervals between which the occasions 708 may be uniformly (or in some cases non-uniformly) distributed to occur within the on durations 404, 424.

In one example, the signal may be a periodic signal, such as a periodic SR as illustrated in the example of FIG. 5A. In another example, the signal may be a SPS signal, such as an SPS PDSCH or SPS SRS as illustrated in the examples of FIGS. 5B and 6. In a further example, the signal or the channel may include a CSI-RS, a PRS, a PDCCH, a SPS PDSCH, a SR, a CSI report, a SRS, or a PUSCH. For instance, referring to the examples of FIGS. 5A, 5B, 6, 7, the signal/channel configuration 704 may configure a periodic SR, an SPS PDSCH, a SPS SRS, or a different signal or channel that is restricted from transmission during off duration 406, 426.

In one example, the reference time is a start time of the on duration, or an offset time from the start time. For instance, referring to FIGS. 5A, 5B, and 6, reference time 506, 526 may be either a start time of on duration 404, 424, such as start time 508, 528, or an offset time from the start time 508, 528, such as a time point shifted positively or negatively with respect to the start time 508, 528, which may be an end time of a current or previous on duration, or an intermediate time between the start time and end time of a current on duration.

In one example, the periodic transmission occasions include all valid occasions for the signal or the channel within the cell DRX cycle or the cell DTX cycle beginning at a time offset with respect to the reference time, the periodicity and offset information including the time offset. For instance, referring to FIGS. 5A, 5B, 6, and 7, periodicity and offset information 706 may include time offset 502, 522 with respect to reference time 506, 526, and the periodic transmission occasions 708 beginning at the time offset 502, 522 may include all valid transmission occasions 712 for signal 722 or channel 726 occurring within cell DRX cycle 402 or cell DTX cycle 422.

In one example, the periodic transmission occasions may include consecutive valid occasions for the signal or the channel beginning at a time offset with respect to the reference time and occurring a specified number of times according to a periodicity, the periodicity and offset information including the time offset and a value of the periodicity. For instance, referring to FIGS. 5A, 5B, 6, and 7, periodicity and offset information 706 may include time offset 502, 522 with respect to reference time 506, 526 and include periodicity 504, 524 between transmission occasions 708, where the periodic transmission occasions 708 beginning at the time offset 502 may include specified quantity

714 X of consecutive valid transmission occasions 712 for signal 722 or channel 726 occurring within cell DRX cycle 402 or cell DTX cycle 422. In one example, the specified number of times of the consecutive valid occasions may be configured in a RRC configuration, a MAC-CE, or DCI. For instance, referring to FIG. 7, specified quantity 714 X of consecutive valid occasions 712 may be configured in RRC configuration 716, MAC-CE 718, or DCI 720.

At block 804, in one example, the periodicity and offset information includes a time offset and a value of a periodicity, and the UE obtains, during the on duration, an activation signal for the signal or the channel after the time offset. For example, 804 may be performed by activation signal component 1042. For instance, referring to FIGS. 5A, 5B, 6, and 7, periodicity and offset information 706 may include time offset 502, 522 and periodicity 504, 524 between transmission occasions 708, and when signal 722 or data 724 in channel 726 is SPS, UE 104 may obtain, during on duration 404, 424, activation signal 606, 728 for the signal 722 or channel 726 such as DCI activating the transmission occasions 708. Obtaining the activation signal may include, for example, receiving, demodulating, and decoding an encoded and modulated signal including the DCI or other activation signal using at least one or more of RX processor(s) 356, TX processor(s) 368, or controller(s)/ processor(s) 359 such as described with respect to UE 350 in FIG. 3. The UE may obtain the activation signal after the time offset 502, 522, for example, after occurrence of invalid transmission occasion 734 such as unused SRS occasion 608.

Finally, at block 806, the UE communicates the signal or data in the channel with the network entity within the on duration according to the periodicity and offset information. For example, 806 may be performed by communication component 1044. For instance, referring to FIGS. 5A, 5B, 6, and 7, in cell DRX, the UE 104 may send the signal 722 or data 724 in the channel 726 to base station 102 during the on duration 404 of the cell DRX cycle 402, or in cell DTX, the UE 104 may obtain the signal 722 or data 724 in the channel 726 from base station 102 during the on duration 424 of cell DTX cycle 422. The communication of the signal or data in the channel thus may include uplink transmission in cell DRX or downlink reception in cell DTX, where communicating on the uplink may include, for example, transmitting, modulating, and encoding the signal or data using at least one or more of the TX processor(s) 368 or controller(s)/ processor(s) 359, and where communicating on the downlink may include, for example, receiving, demodulating, and decoding the signal or data using at least one or more of the RX processor(s) 356 or controller(s)/processor(s) 359, such as described with respect to UE 350 in FIG. 3. In either the uplink or downlink case, the signal 722 or data 724 in channel 726 may be communicated according to the periodicity and offset information 706. For example, the UE 104 may send or obtain the signal 722 or data 724 in the channel 726 at consecutive valid time intervals or transmission occasions 712 specified by the value of periodicity 504, 524 and starting at the time offset 502, 522 with respect to the reference time 506, 526.

In one example, the periodicity and offset information includes a time offset for the signal or the channel, and the signal or the data in the channel is communicated within the on duration beginning at the time offset with respect to the reference time. For instance, referring to FIGS. 5A, 5B, 6, and 7, the periodicity and offset information 706 may configure the time offset 502, 522 with respect to the reference time 506, 526 for periodic transmission occasions 708, such as SR occasions 410, SPS DL occasions 430, or SPS SRS occasions 604, and the UE 104 may send or obtain the signal 722 or data 724 in the channel 726 during the on durations 404, 424 in the periodic transmission occasions 708 beginning at the time offset 502, 522.

In one example, the periodicity and offset information includes a value of a periodicity of the signal or the channel, and the signal or the data in the channel is communicated within the on duration according to the periodicity. For instance, referring to FIGS. 5A, 5B, 6, and 7, the periodicity and offset information 706 may configure a value of periodicity 504, 524 for periodic transmission occasions 708, such as SR occasions 410, SPS DL occasions 430, or SPS SRS occasions 604, and the UE 104 may send or obtain the signal 722 or data 724 in the channel 726 during the on durations 404, 424 in the periodic transmission occasions 708 occurring at the time intervals specified by periodicity 504, 524.

In one example, the signal configuration is a semi-persistent configuration including a time offset, a value of a periodicity, and a quantity of the periodic transmission occasions for the signal or the channel, the signal or the data in the channel being communicated within the on duration according to the periodicity following activation of the periodic transmission occasions and beginning at the time offset with respect to the reference time over the quantity of the periodic transmission occasions. For instance, referring to FIGS. 5A, 5B, 6, and 7, the signal configuration, such as signal/channel configuration 704, may include the time offset 502, 522, the value of periodicity 504, 524, and the quantity 710 of periodic transmission occasions 708, such as a number of SPS DL occasions 430 or SPS SRS occasions 604 across one or multiple cell DRX cycles 402 or cell DTX cycles 422. Upon activation 730 of these transmission occasions 708 in response to reception of activation signal 728, the UE 104 and the base station 102 may communicate the signal 722 or data 724 in the channel 726 within the on durations 404, 424 of the cell DRX cycle 402 or cell DTX cycle 422 over the quantity 710 of transmission occasions 708, which follow the configured periodicity 504, 524 and time offset 502, 522 with respect to reference time 506, 526.

In response to the activation signal at block 804 being obtained after the time offset, the signal or the data in the channel is communicated during the on duration beginning at a next available transmission occasion following the time offset according to the periodicity. For instance, referring to FIGS. 5A, 5B, 6, and 7, if the activation signal 606, 728 is received after the time offset 502, 522, the UE 104 and the base station 102 may communicate the signal 722 or data 724 in the channel 726 within the on durations 404, 424 of the cell DRX cycle 402 or cell DTX cycle 422, starting at the next available transmission occasion 610, 732 following the time offset 502.

FIG. 9 is a flowchart 900 of a method of wireless communication. The method may be performed by a network entity such as a base station or one or more of its components, for example, the base station 102/180, 310; disaggregated base station 181 or one or more of its components; one or more of RX processor(s) 370, TX processor(s) 316, or controller(s)/processor(s) 375; the apparatus 1102; or baseband unit(s) 1104 or its components. The method allows a network entity to configure periodic and semi-persistent signals or channels in aligned periodic transmission occasions within cell DRX cycles or cell DTX cycles to improve communication efficiency and energy-saving in wireless networks. Optional aspects are illustrated in dashed lines.

At block 902, the network entity may send, to a UE, a signal configuration indicating periodicity and offset information for a signal or a channel. For example, 902 may be performed by signal configuration component 1140. For instance, referring to FIGS. 5A, 5B, 6, and 7, the base station 102 may send a signal configuration, such as signal/channel configuration 704, to UE 104, for signal 722 or channel 726. The signal configuration may include periodicity and offset information 706 for periodic transmission occasions 708 such as, but not limited to, SR occasions 410, SPS DL occasions 430, or SPS SRS occasions 604. Sending the signal configuration may include, for example, encoding, modulating, and transmitting the signal configuration using at least one or more of TX processor(s) 316 or controller(s)/processor(s) 375 such as described with respect to BS 310 in FIG. 3.

The periodicity and offset information is configured to align periodic transmission occasions of the signal or the channel within an on duration of a cell DRX cycle or a cell DTX cycle beginning with respect to a reference time associated with the cell DRX cycle or the cell DTX cycle. For instance, referring to FIGS. 5A, 5B, 6, and 7, the periodicity and offset information 706 may align periodic transmission occasions 708, such as SR occasions 410, SPS DL occasions 430, or SPS SRS occasions 604 within the on durations 404, 424 of cell DRX cycle 402 or cell DTX cycle 422, beginning with respect to reference time 506, 526 associated with the cell DRX cycle 402 or the cell DTX cycle 422. For example, to align the transmission occasions 708 within the on durations, the periodicity and offset information 706 may specify the timing at which these occasions 708 periodically begin to occur with respect to the reference time 506, 526 associated with the cell DRX cycle 402 or cell DTX cycle 422, and the time intervals between which the occasions 708 may be uniformly (or in some cases non-uniformly) distributed to occur within the on durations 404, 424.

In one example, the signal may be a periodic signal, such as a periodic SR as illustrated in the example of FIG. 5A. In another example, the signal may be a SPS signal, such as an SPS PDSCH or SPS SRS as illustrated in the examples of FIGS. 5B and 6. In a further example, the signal or the channel may include a CSI-RS, a PRS, a PDCCH, a SPS PDSCH, a SR, a CSI report, a SRS, or a PUSCH. For instance, referring to the examples of FIGS. 5A, 5B, 6, 7, the signal/channel configuration 704 may configure a periodic SR, an SPS PDSCH, a SPS SRS, or a different signal or channel that is restricted from transmission during off duration 406, 426.

In one example, the reference time is a start time of the on duration, or an offset time from the start time. For instance, referring to FIGS. 5A, 5B, and 6, reference time 506, 526 may be either a start time of on duration 404, 424, such as start time 508, 528, or an offset time from the start time 508, 528, such as a time point shifted positively or negatively with respect to the start time 508, 528, which may be an end time of a current or previous on duration, or an intermediate time between the start time and end time of a current on duration.

In one example, the periodic transmission occasions include all valid occasions for the signal or the channel within the cell DRX cycle or the cell DTX cycle beginning at a time offset with respect to the reference time, the periodicity and offset information including the time offset. For instance, referring to FIGS. 5A, 5B, 6, and 7, periodicity and offset information 706 may include time offset 502, 522 with respect to reference time 506, 526, and the periodic transmission occasions 708 beginning at the time offset 502, 522 may include all valid transmission occasions 712 for signal 722 or channel 726 occurring within cell DRX cycle 402 or cell DTX cycle 422.

In one example, the periodic transmission occasions may include consecutive valid occasions for the signal or the channel beginning at a time offset with respect to the reference time and occurring a specified number of times according to a periodicity, the periodicity and offset information including the time offset and a value of the periodicity. For instance, referring to FIGS. 5A, 5B, 6, and 7, periodicity and offset information 706 may include time offset 502, 522 with respect to reference time 506, 526 and include periodicity 504, 524 between transmission occasions 708, where the periodic transmission occasions 708 beginning at the time offset 502 may include specified quantity 714 X of consecutive valid transmission occasions 712 for signal 722 or channel 726 occurring within cell DRX cycle 402 or cell DTX cycle 422. In one example, the specified number of times of the consecutive valid occasions may be configured in a RRC configuration, a MAC-CE, or DCI. For instance, referring to FIG. 7, specified quantity 714 X of consecutive valid occasions 712 may be configured in RRC configuration 716, MAC-CE 718, or DCI 720.

At block 904, in one example, the periodicity and offset information includes a time offset and a value of a periodicity, and the network entity sends, during the on duration, an activation signal for the signal or the channel after the time offset. For example, 904 may be performed by activation signal component 1142. For instance, referring to FIGS. 5A, 5B, 6, and 7, periodicity and offset information 706 may include time offset 502, 522 and periodicity 504, 524 between transmission occasions 708, and when signal 722 or data 724 in channel 726 is SPS, base station 102 may send, during on duration 404, 424, activation signal 606, 728 for the signal 722 or channel 726 such as DCI activating the transmission occasions 708. Sending the activation signal may include, for example, encoding, modulating, and transmitting the DCI or other activation signal using at least one or more of TX processor(s) 316 or controller(s)/processor(s) 375 such as described with respect to BS 310 in FIG. 3. The network entity may send the activation signal after the time offset 502, 522, for example, after occurrence of invalid transmission occasion 734 such as unused SRS occasion 608.

Finally, at block 906, the network entity communicates the signal or data in the channel with the UE within the on duration according to the periodicity and offset information. For example, 906 may be performed by communication component 1144. For instance, referring to FIGS. 5A, 5B, 6, and 7, in cell DRX, the base station 102 may obtain the signal 722 or data 724 in the channel 726 from UE 104 during the on duration 404 of the cell DRX cycle 402, or in cell DTX, the base station 102 may send the signal 722 or data 724 in the channel 726 to UE 104 during the on duration 424 of cell DTX cycle 422. The communication of the signal or data in the channel thus may include uplink reception in cell DRX or downlink transmission in cell DTX, where communicating on the downlink may include, for example, transmitting, modulating, and encoding the signal or data using at least one or more of the TX processor(s) 316 or controller(s)/processor(s) 375, and where communicating on the uplink may include, for example, receiving, demodulating, and decoding the signal or data using at least one or more of the RX processor(s) 370 or controller(s)/processor(s) 375, such as described with respect to BS 310 in FIG. 3. In either the uplink or downlink case, the signal 722 or data 724 in channel 726 may be communicated according to the periodicity and offset information 706. For example, the base station 102 may send or obtain the signal 722 or data 724 in the channel 726 at consecutive valid time intervals or transmission occasions 712 specified by the value of periodicity 504, 524 and starting at the time offset 502, 522 with respect to the reference time 506, 526.

In one example, the periodicity and offset information includes a time offset for the signal or the channel, and the signal or the data in the channel is communicated within the on duration beginning at the time offset with respect to the reference time. For instance, referring to FIGS. 5A, 5B, 6, and 7, the periodicity and offset information 706 may configure the time offset 502, 522 with respect to the reference time 506, 526 for periodic transmission occasions 708, such as SR occasions 410, SPS DL occasions 430, or SPS SRS occasions 604, and the base station 102 may send or obtain the signal 722 or data 724 in the channel 726 during the on durations 404, 424 in the periodic transmission occasions 708 beginning at the time offset 502, 522.

In one example, the periodicity and offset information includes a value of a periodicity of the signal or the channel, and the signal or the data in the channel is communicated within the on duration according to the periodicity. For instance, referring to FIGS. 5A, 5B, 6, and 7, the periodicity and offset information 706 may configure a value of periodicity 504, 524 for periodic transmission occasions 708, such as SR occasions 410, SPS DL occasions 430, or SPS SRS occasions 604, and the base station 102 may send or obtain the signal 722 or data 724 in the channel 726 during the on durations 404, 424 in the periodic transmission occasions 708 occurring at the time intervals specified by periodicity 504, 524.

In one example, the signal configuration is a semi-persistent configuration including a time offset, a value of a periodicity, and a quantity of the periodic transmission occasions for the signal or the channel, the signal or the data in the channel being communicated within the on duration according to the periodicity following activation of the periodic transmission occasions and beginning at the time offset with respect to the reference time over the quantity of the periodic transmission occasions. For instance, referring to FIGS. 5A, 5B, 6, and 7, the signal configuration, such as signal/channel configuration 704, may include the time offset 502, 522, the value of periodicity 504, 524, and the quantity 710 of periodic transmission occasions 708, such as a number of SPS DL occasions 430 or SPS SRS occasions 604 across one or multiple cell DRX cycles 402 or cell DTX cycles 422. Upon activation 730 of these transmission occasions 708 in response to transmission of activation signal 728, the UE 104 and the base station 102 may communicate the signal 722 or data 724 in the channel 726 within the on durations 404, 424 of the cell DRX cycle 402 or cell DTX cycle 422 over the quantity 710 of transmission occasions 708, which follow the configured periodicity 504, 524 and time offset 502, 522 with respect to reference time 506, 526.

In response to the activation signal at block 904 being sent after the time offset, the signal or the data in the channel is communicated during the on duration beginning at a next available transmission occasion following the time offset according to the periodicity. For instance, referring to FIGS. 5A, 5B, 6, and 7, if the activation signal 606, 728 is transmitted after the time offset 502, 522, the UE 104 and the base station 102 may communicate the signal 722 or data 724 in the channel 726 within the on durations 404, 424 of the cell DRX cycle 402 or cell DTX cycle 422, starting at the next available transmission occasion 610, 732 following the time offset 502.

Figure 10:
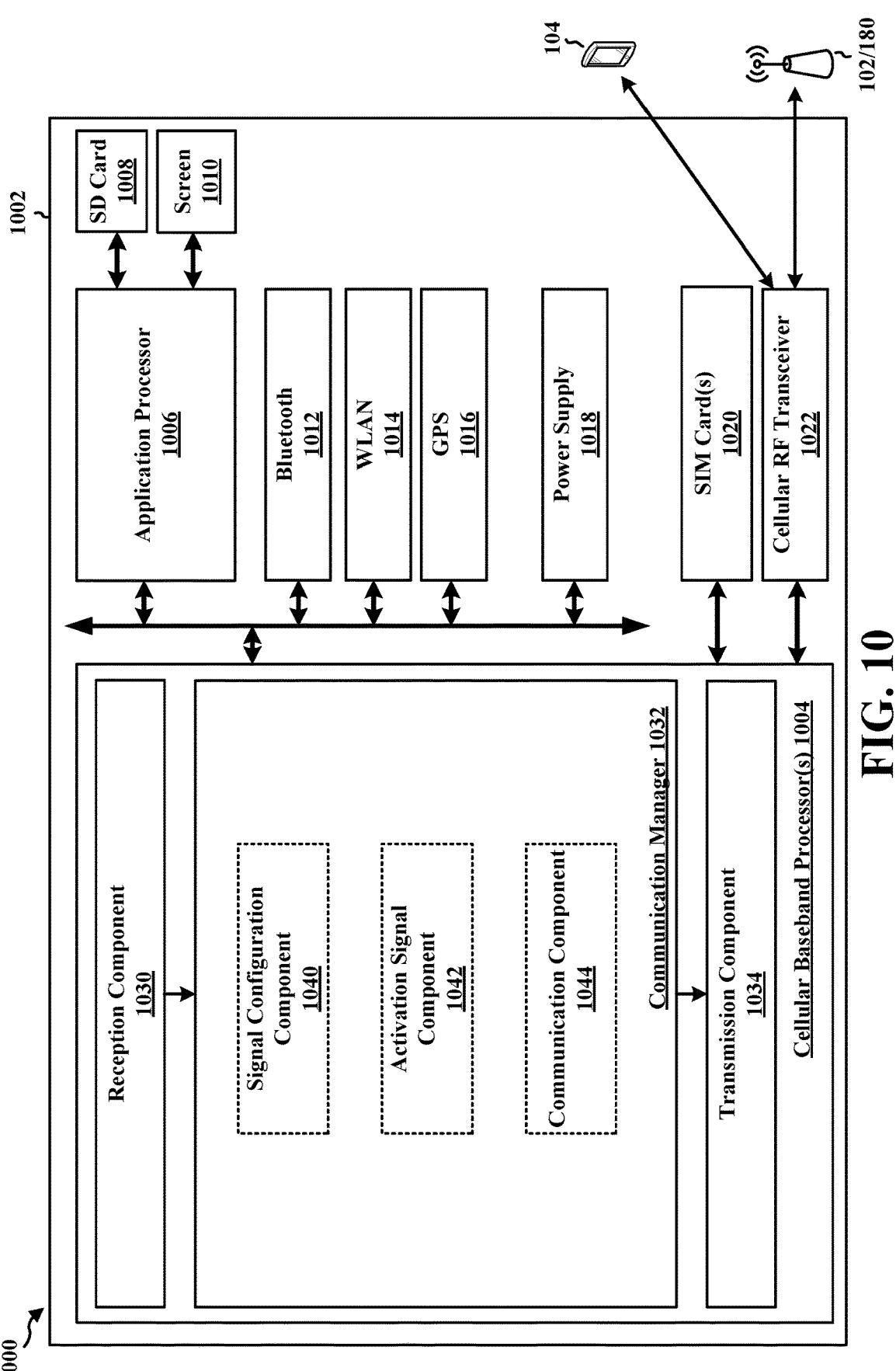
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes one or more cellular baseband processors 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The one or more cellular baseband processors 1004 communicate through the cellular RF transceiver 1022 with the UE 104 and/or BS 102/180/disaggregated base station 181. The one or more cellular baseband processors 1004 may each include a computer-readable medium/one or more memories. The computer-readable medium/one or more memories may be non-transitory. The one or more cellular baseband processors 1004 are responsible for general processing, including the execution of software stored on the computer-readable medium/one or more memories individually or in combination. The software, when executed by the one or more cellular baseband processors 1004, causes the one or more cellular baseband processors 1004 to, individually or in combination, perform the various functions described supra. The computer-readable medium/one or more memories may also be used individually or in combination for storing data that is manipulated by the one or more cellular baseband processors 1004 when executing software. The one or more cellular baseband processors 1004 individually or in combination further include a reception component 1030, a communication manager 1032, and a transmission component 1034. The communication manager 1032 includes the one or more illustrated components. The components within the communication manager 1032 may be stored in the computer-readable medium/one or more memories and/or configured as hardware within the one or more cellular baseband processors 1004. The one or more cellular baseband processors 1004 may be components of the UE 350 and may individually or in combination include the one or more memories 360 and/or at least one of the one or more TX processors 368, at least one of the one or more RX processors 356, and at least one of the one or more controllers/processors 359. For example, the reception component 1030 may include at least the one or more RX processors 356, the transmission component 1034 may include at least the one or more TX processors 368, and the communication manager 1032 may include at least the one or more controllers/processors 359. In one configuration, the apparatus 1002 may be a modem chip and include just the one or more baseband processors 1004, and in another configuration, the apparatus 1002 may be the entire UE (e.g., see 350 of FIG. 3) and include the aforediscussed additional modules of the apparatus 1002.

The communication manager 1032 includes a signal configuration component 1040 that is configured to obtain, from a network entity, for example via reception component 1030, a signal configuration indicating periodicity and offset information for a signal or a channel, the periodicity and offset information configured to align periodic transmission occasions of the signal or the channel within an on duration of a cell DRX cycle or a cell DTX cycle beginning with respect to a reference time associated with the cell DRX cycle or the cell DTX cycle, such as described in connection with block 802. The communication manager 1032 may further include an activation signal component 1042 that is configured to obtain, for example via reception component 1030, during the on duration, an activation signal for the signal or the channel after a time offset included in the periodicity and offset information, such as described in connection with block 804. The communication manager 1032 may further include a communication component 1044 that is configured to communicate, for example via transmission component 1034 or reception component 1030, the signal or data in the channel with the network entity within the on duration according to the periodicity and offset information, such as described in connection with block 806.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by one or more processors individually or in combination configured to perform the stated processes/algorithm, stored within a computer-readable medium for implementation by one or more processors, or some combination thereof.

In one configuration, the apparatus 1002, and in particular one or more cellular baseband processors 1004, includes means for obtaining, from a network entity, a signal configuration indicating periodicity and offset information for a signal or a channel, the periodicity and offset information configured to align periodic transmission occasions of the signal or the channel within an on duration of a cell DRX cycle or a cell DTX cycle beginning with respect to a reference time associated with the cell DRX cycle or the cell DTX cycle; and means for communicating the signal or data in the channel with the network entity within the on duration according to the periodicity and offset information.

The aforementioned means may be one or more of the aforementioned components of the apparatus 1002 configured to perform the functions recited by the aforementioned means. As described supra, the apparatus 1002 may include the one or more TX Processors 368, the one or more RX Processors 356, and the one or more controllers/processors 359. As such, in one configuration, the aforementioned means may be at least one of the one or more TX Processors 368, at least one of the one or more RX Processors 356, or at least one of the one or more controllers/processors 359, individually or in any combination configured to perform the functions recited by the aforementioned means.

Figure 11:
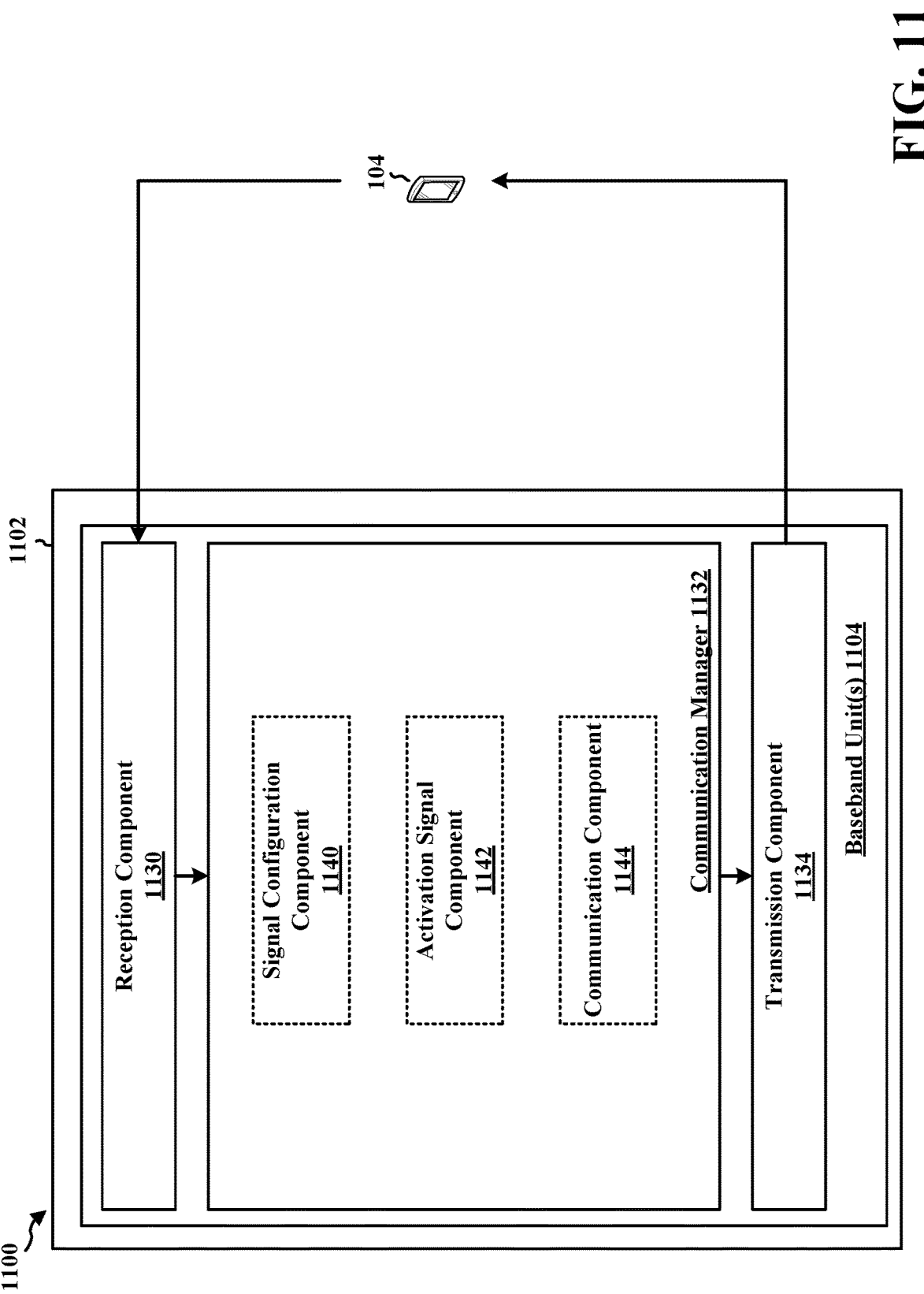
FIG. 11 is a diagram illustrating another example of a hardware implementation for another example apparatus.

FIG. 11 is a diagram 1100 illustrating an example of a hardware implementation for an apparatus 1102. The apparatus 1102 is a network entity such as a base station and includes one or more baseband units 1104. The one or more baseband units 1104 communicate through a cellular RF transceiver with the UE 104. The one or more baseband units 1104 may each include a computer-readable medium/one or more memories. The computer-readable medium/one or more memories may be non-transitory. The one or more baseband units 1104 are responsible for general processing, including the execution of software stored on the computer-readable medium/one or more memories individually or in combination. The software, when executed by the one or more baseband units 1104, causes the one or more baseband units 1104 to, individually or in combination, perform the various functions described supra. The computer-readable medium/one or more memories may also be used individually or in combination for storing data that is manipulated by the one or more baseband units 1104 when executing software. The one or more baseband units 1104 individually or in combination further include a reception component 1130, a communication manager 1132, and a transmission component 1134. The communication manager 1132 includes the one or more illustrated components. The components within the communication manager 1132 may be stored in the computer-readable medium/one or more memories and/or configured as hardware within the one or more baseband units 1104. The one or more baseband units 1104 may be components of the BS 310 and may individually or in combination include the one or more memories 376 and/or at least one of the one or more TX processors 316, at least one of the one or more RX processors 370, and at least one of the one or more controllers/processors 375. For example, the reception component 1130 may include at least the one or more RX processors 370, the transmission component 1134 may include at least the one or more TX processors 316, and the communication manager 1132 may include at least the one or more controllers/processors 375.

The communication manager 1132 includes a signal configuration component 1140 that is configured to send, to a UE, for example via transmission component 1134, a signal configuration indicating periodicity and offset information for a signal or a channel, the periodicity and offset information configured to align periodic transmission occasions of the signal or the channel within an on duration of a cell DRX cycle or a cell DTX cycle beginning with respect to a reference time associated with the cell DRX cycle or the cell DTX cycle, such as described in connection with block 902. The communication manager 1132 may further include an activation signal component 1042 that is configured to send, for example via transmission component 1030, during the on duration, an activation signal for the signal or the channel after a time offset included in the periodicity and offset information, such as described in connection with block 904. The communication manager 1132 may further include a communication component 1144 that is configured to communicate, for example via transmission component 1134 or reception component 1130, the signal or data in the channel with the UE within the on duration according to the periodicity and offset information, such as described in connection with block 906.

The apparatus may include additional components that perform each of the blocks of the algorithm in the aforementioned flowchart of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by one or more processors individually or in combination configured to perform the stated processes/algorithm, stored within a computer-readable medium for implementation by one or more processors, or some combination thereof.

In one configuration, the apparatus 1102, and in particular the one or more baseband units 1104, includes means for sending, to a UE, a signal configuration indicating periodicity and offset information for a signal or a channel, the periodicity and offset information configured to align periodic transmission occasions of the signal or the channel within an on duration of a cell DRX cycle or a cell DTX cycle beginning with respect to a reference time associated with the cell DRX cycle or the cell DTX cycle; and means for communicating the signal or data in the channel with the UE within the on duration according to the periodicity and offset information.

The aforementioned means may be one or more of the aforementioned components of the apparatus 1102 configured to perform the functions recited by the aforementioned means. As described supra, the apparatus 1102 may include the one or more TX Processors 316, the one or more RX Processors 370, and the one or more controllers/processors 375. As such, in one configuration, the aforementioned means may be at least one of the one or more TX Processors 316, at least one of the one or more RX Processors 370, or at least one of the one or more controllers/processors 375, individually or in any combination configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, a processor, at least one processor, and/or one or more processors, individually or in combination, configured to perform or operable for performing a plurality of actions (such as the functions described supra) is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

Similarly as used herein, a memory, at least one memory, a computer-readable medium, and/or one or more memories, individually or in combination, configured to store or having stored thereon instructions executable by one or more processors for performing a plurality of actions (such as the functions described supra) is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, a computer-readable medium, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, a second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processors may in combination execute the respective subset of instruction to accomplish performing actions X, Y, and Z. Alternatively, a single processor may execute the instructions stored on a single memory, or distributed across multiple memories, to accomplish performing actions X, Y, and Z.

The following examples are illustrative only and may be combined with aspects of other embodiments or teachings described herein, without limitation.

Clause 1. An apparatus for wireless communication, comprising: one or more memories; and one or more processors each communicatively coupled with at least one of the one or more memories, the one or more processors, individually or in any combination, operable to cause the apparatus to: obtain, from a network entity, a signal configuration indicating periodicity and offset information for a signal or a channel, the periodicity and offset information configured to align periodic transmission occasions of the signal or the channel within an on duration of a cell Discontinuous Reception (DRX) cycle or a cell Discontinuous Transmission (DTX) cycle beginning with respect to a reference time associated with the cell DRX cycle or the cell DTX cycle; and communicate the signal or data in the channel with the network entity within the on duration according to the periodicity and offset information.

Clause 2. The apparatus of clause 1, wherein the reference time is a start time of the on duration, or an offset time from the start time.

Clause 3. The apparatus of clause 1 or clause 2, wherein the periodicity and offset information includes a time offset for the signal or the channel, and the signal or the data in the channel is communicated within the on duration beginning at the time offset with respect to the reference time.

Clause 4. The apparatus of any of clauses 1 to 3, wherein the periodicity and offset information includes a value of a periodicity of the signal or the channel, and the signal or the data in the channel is communicated within the on duration according to the periodicity.

Clause 5. The apparatus of any of clauses 1 to 4, wherein the periodic transmission occasions include all valid occasions for the signal or the channel within the cell DRX cycle or the cell DTX cycle beginning at a time offset with respect to the reference time, the periodicity and offset information including the time offset.

Clause 6. The apparatus of any of clauses 1 to 5, wherein the periodic transmission occasions include consecutive valid occasions for the signal or the channel beginning at a time offset with respect to the reference time and occurring a specified number of times according to a periodicity, the periodicity and offset information including the time offset and a value of the periodicity.

Clause 7. The apparatus of clause 6, wherein the specified number of times of the consecutive valid occasions is configured in a radio resource control (RRC) configuration, a medium access control (MAC) control element (MAC-CE), or downlink control information (DCI).

Clause 8. The apparatus of any of clauses 1 to 7, wherein the signal configuration is a semi-persistent configuration including a time offset, a value of a periodicity, and a quantity of the periodic transmission occasions for the signal or the channel, the signal or the data in the channel being communicated within the on duration according to the periodicity following activation of the periodic transmission occasions and beginning at the time offset with respect to the reference time over the quantity of the periodic transmission occasions.

Clause 9. The apparatus of any of clauses 1 to 8, wherein the periodicity and offset information includes a time offset and a value of a periodicity, and the one or more processors, individually or in any combination, are further operable to cause the apparatus to: obtain, during the on duration, an activation signal for the signal or the channel after the time offset, wherein in response to the activation signal being obtained after the time offset, the signal or the data in the channel is communicated during the on duration beginning at a next available transmission occasion following the time offset according to the periodicity.

Clause 10. The apparatus of any of clauses 1 to 9, wherein the signal is a periodic signal or a semi-persistently scheduled (SPS) signal.

Clause 11. The apparatus of any of clauses 1 to 10, wherein the signal or the channel includes: a channel state information (CSI) reference signal (CSI-RS), a positioning reference signal (PRS), a physical downlink control channel (PDCCH), a semi-persistently scheduled (SPS) physical downlink shared channel (PDSCH), a scheduling request (SR), a CSI report, a sounding reference signal (SRS), or a physical uplink shared channel (PUSCH).

Clause 12. A method of wireless communication performable at a user equipment (UE), comprising: obtaining, from a network entity, a signal configuration indicating periodicity and offset information for a signal or a channel, the periodicity and offset information configured to align periodic transmission occasions of the signal or the channel within an on duration of a cell Discontinuous Reception (DRX) cycle or a cell Discontinuous Transmission (DTX) cycle beginning with respect to a reference time associated with the cell DRX cycle or the cell DTX cycle; and communicating the signal or data in the channel with the network entity within the on duration according to the periodicity and offset information.

Clause 13. The method of clause 12, wherein the periodicity and offset information includes a time offset and a value of a periodicity for the signal or the channel, and the signal or the data in the channel is communicated within the on duration beginning at the time offset with respect to the reference time and according to the periodicity.

Clause 14. The method of clause 12 or 13, wherein the periodic transmission occasions include all valid occasions for the signal or the channel within the cell DRX cycle or the cell DTX cycle beginning at a time offset with respect to the reference time, the periodicity and offset information including the time offset.

Clause 15. The method of any of clauses 12 to 14, wherein the periodic transmission occasions include consecutive valid occasions for the signal or the channel beginning at a time offset with respect to the reference time and occurring a specified number of times according to a periodicity, the periodicity and offset information including the time offset and a value of the periodicity.

Clause 16. The method of any of clauses 12 to 15, wherein the signal configuration is a semi-persistent configuration including a time offset, a value of a periodicity, and a quantity of the periodic transmission occasions for the signal or the channel, the signal or the data in the channel being communicated within the on duration according to the periodicity following activation of the periodic transmission occasions and beginning at the time offset with respect to the reference time over the quantity of the periodic transmission occasions.

Clause 17. The method of any of clauses 12 to 16, wherein the periodicity and offset information includes a time offset and a value of a periodicity, and the method further comprises: obtaining, during the on duration, an activation signal for the signal or the channel after the time offset, wherein in response to the activation signal being obtained after the time offset, the signal or the data in the channel is communicated during the on duration beginning at a next available transmission occasion following the time offset according to the periodicity.

Clause 18. An apparatus for wireless communication, comprising: one or more memories; and one or more processors each communicatively coupled with at least one of the one or more memories, the one or more processors, individually or in any combination, operable to cause the apparatus to: send, to a user equipment (UE), a signal configuration indicating periodicity and offset information for a signal or a channel, the periodicity and offset information configured to align periodic transmission occasions of the signal or the channel within an on duration of a cell Discontinuous Reception (DRX) cycle or a cell Discontinuous Transmission (DTX) cycle beginning with respect to a reference time associated with the cell DRX cycle or the cell DTX cycle; and communicate the signal or data in the channel with the UE within the on duration according to the periodicity and offset information.

Clause 19. The apparatus of clause 18, wherein the reference time is a start time of the on duration, or an offset time from the start time.

Clause 20. The apparatus of clause 18 or 19, wherein the periodicity and offset information includes a time offset for the signal or the channel, and the signal or the data in the channel is communicated within the on duration beginning at the time offset with respect to the reference time.

Clause 21. The apparatus of any of clauses 18 to 20, wherein the periodicity and offset information includes a value of a periodicity of the signal or the channel, and the signal or the data in the channel is communicated within the on duration according to the periodicity.

Clause 22. The apparatus of any of clauses 18 to 21, wherein the periodic transmission occasions include all valid occasions for the signal or the channel within the cell DRX cycle or the cell DTX cycle beginning at a time offset with respect to the reference time, the periodicity and offset information including the time offset.

Clause 23. The apparatus of any of clauses 18 to 22, wherein the periodic transmission occasions include consecutive valid occasions for the signal or the channel beginning at a time offset with respect to the reference time and occurring a specified number of times according to a periodicity, the periodicity and offset information including the time offset and a value of the periodicity.

Clause 24. The apparatus of any of clauses 18 to 23, wherein the signal configuration is a semi-persistent configuration including a time offset, a value of a periodicity, and a quantity of the periodic transmission occasions for the signal or the channel, the signal or the data in the channel being communicated within the on duration according to the periodicity following activation of the periodic transmission occasions and beginning at the time offset with respect to the reference time over the quantity of the periodic transmission occasions.

Clause 25. The apparatus of any of clauses 18 to 24, wherein the periodicity and offset information includes a time offset and a value of a periodicity, and the one or more processors, individually or in any combination, are further operable to cause the apparatus to: send, during the on duration, an activation signal for the signal or the channel after the time offset, wherein in response to the activation signal being sent after the time offset, the signal or the data in the channel is communicated during the on duration beginning at a next available transmission occasion following the time offset according to the periodicity.

Clause 26. A method of wireless communication performable at network entity, comprising: sending, to a user equipment (UE), a signal configuration indicating periodicity and offset information for a signal or a channel, the periodicity and offset information configured to align periodic transmission occasions of the signal or the channel within an on duration of a cell Discontinuous Reception (DRX) cycle or a cell Discontinuous Transmission (DTX) cycle beginning with respect to a reference time associated with the cell DRX cycle or the cell DTX cycle; and communicating the signal or data in the channel with the UE within the on duration according to the periodicity and offset information.

Clause 27. The method of clause 26, wherein the periodic transmission occasions include all valid occasions for the signal or the channel within the cell DRX cycle or the cell DTX cycle beginning at a time offset with respect to the reference time, the periodicity and offset information including the time offset.

Clause 28. The method of clause 26 or 27, wherein the periodic transmission occasions include consecutive valid occasions for the signal or the channel beginning at a time offset with respect to the reference time and occurring a specified number of times according to a periodicity, the periodicity and offset information including the time offset and a value of the periodicity.

Clause 29. The method of any of clauses 26 to 28, wherein the signal configuration is a semi-persistent configuration including a time offset, a value of a periodicity, and a quantity of the periodic transmission occasions for the signal or the channel, the signal or the data in the channel being communicated within the on duration according to the periodicity following activation of the periodic transmission occasions and beginning at the time offset with respect to the reference time over the quantity of the periodic transmission occasions.

Clause 30. The method of any of clauses 26 to 29, wherein the periodicity and offset information includes a time offset and a value of a periodicity, and the method further comprises: sending, during the on duration, an activation signal for the signal or the channel after the time offset, wherein in response to the activation signal being sent after the time offset, the signal or the data in the channel is communicated during the on duration beginning at a next available transmission occasion following the time offset according to the periodicity.

What is claimed is:

1. An apparatus for wireless communication, comprising:
one or more memories; and
one or more processors each communicatively coupled with at least one of the one or more memories, the one or more processors, individually or in any combination, operable to cause the apparatus to:
obtain, from a network entity, a signal configuration indicating periodicity and offset information for a signal or a channel, the periodicity and offset information configured to align periodic transmission occasions of the signal or the channel within an on duration of a cell Discontinuous Reception (DRX)

cycle or a cell Discontinuous Transmission (DTX) cycle beginning with respect to a reference time associated with the cell DRX cycle or the cell DTX cycle; and communicate the signal or data in the channel with the network entity within the on duration according to the periodicity and offset information.

2. The apparatus of claim 1, wherein the reference time is a start time of the on duration, or an offset time from the start time.

3. The apparatus of claim 1, wherein the periodicity and offset information includes a time offset for the signal or the channel, and the signal or the data in the channel is communicated within the on duration beginning at the time offset with respect to the reference time.

4. The apparatus of claim 1, wherein the periodicity and offset information includes a value of a periodicity of the signal or the channel, and the signal or the data in the channel is communicated within the on duration according to the periodicity.

5. The apparatus of claim 1, wherein the periodic transmission occasions include all valid occasions for the signal or the channel within the cell DRX cycle or the cell DTX cycle beginning at a time offset with respect to the reference time, the periodicity and offset information including the time offset.

6. The apparatus of claim 1, wherein the periodic transmission occasions include consecutive valid occasions for the signal or the channel beginning at a time offset with respect to the reference time and occurring a specified number of times according to a periodicity, the periodicity and offset information including the time offset and a value of the periodicity.

7. The apparatus of claim 6, wherein the specified number of times of the consecutive valid occasions is configured in a radio resource control (RRC) configuration, a medium access control (MAC) control element (MAC-CE), or downlink control information (DCI).

8. The apparatus of claim 1, wherein the signal configuration is a semi-persistent configuration including a time offset, a value of a periodicity, and a quantity of the periodic transmission occasions for the signal or the channel, the signal or the data in the channel being communicated within the on duration according to the periodicity following activation of the periodic transmission occasions and beginning at the time offset with respect to the reference time over the quantity of the periodic transmission occasions.

9. The apparatus of claim 1, wherein the periodicity and offset information includes a time offset and a value of a periodicity, and the one or more processors, individually or in any combination, are further operable to cause the apparatus to:

obtain, during the on duration, an activation signal for the signal or the channel after the time offset, wherein in response to the activation signal being obtained after the time offset, the signal or the data in the channel is communicated during the on duration beginning at a next available transmission occasion following the time offset according to the periodicity.

10. The apparatus of claim 1, wherein the signal is a periodic signal or a semi-persistently scheduled (SPS) signal.

11. The apparatus of claim 1, wherein the signal or the channel includes:

a channel state information (CSI) reference signal (CSI-RS), a positioning reference signal (PRS), a physical downlink control channel (PDCCH), a semi-persistently scheduled (SPS) physical downlink shared channel (PDSCH), a scheduling request (SR), a CSI report, a sounding reference signal (SRS), or a physical uplink shared channel (PUSCH).

12. A method of wireless communication performable at a user equipment (UE), comprising:

obtaining, from a network entity, a signal configuration indicating periodicity and offset information for a signal or a channel, the periodicity and offset information configured to align periodic transmission occasions of the signal or the channel within an on duration of a cell Discontinuous Reception (DRX) cycle or a cell Discontinuous Transmission (DTX) cycle beginning with respect to a reference time associated with the cell DRX cycle or the cell DTX cycle; and communicating the signal or data in the channel with the network entity within the on duration according to the periodicity and offset information.

13. The method of claim 12, wherein the periodicity and offset information includes a time offset and a value of a periodicity for the signal or the channel, and the signal or the data in the channel is communicated within the on duration beginning at the time offset with respect to the reference time and according to the periodicity.

14. The method of claim 12, wherein the periodic transmission occasions include all valid occasions for the signal or the channel within the cell DRX cycle or the cell DTX cycle beginning at a time offset with respect to the reference time, the periodicity and offset information including the time offset.

15. The method of claim 12, wherein the periodic transmission occasions include consecutive valid occasions for the signal or the channel beginning at a time offset with respect to the reference time and occurring a specified number of times according to a periodicity, the periodicity and offset information including the time offset and a value of the periodicity.

16. The method of claim 12, wherein the signal configuration is a semi-persistent configuration including a time offset, a value of a periodicity, and a quantity of the periodic transmission occasions for the signal or the channel, the signal or the data in the channel being communicated within the on duration according to the periodicity following activation of the periodic transmission occasions and beginning at the time offset with respect to the reference time over the quantity of the periodic transmission occasions.

17. The method of claim 12, wherein the periodicity and offset information includes a time offset and a value of a periodicity, and the method further comprises:

obtaining, during the on duration, an activation signal for the signal or the channel after the time offset, wherein in response to the activation signal being obtained after the time offset, the signal or the data in the channel is communicated during the on duration beginning at a next available transmission occasion following the time offset according to the periodicity.

18. An apparatus for wireless communication, comprising:

one or more memories; and one or more processors each communicatively coupled with at least one of the one or more memories, the one or more processors, individually or in any combination, operable to cause the apparatus to:

send, to a user equipment (UE), a signal configuration indicating periodicity and offset information for a signal or a channel, the periodicity and offset information configured to align periodic transmission occasions of the signal or the channel within an on duration of a cell Discontinuous Reception (DRX) cycle or a cell Discontinuous Transmission (DTX) cycle beginning with respect to a reference time associated with the cell DRX cycle or the cell DTX cycle; and communicate the signal or data in the channel with the UE within the on duration according to the periodicity and offset information.

19. The apparatus of claim 18, wherein the reference time is a start time of the on duration, or an offset time from the start time.

20. The apparatus of claim 18, wherein the periodicity and offset information includes a time offset for the signal or the channel, and the signal or the data in the channel is communicated within the on duration beginning at the time offset with respect to the reference time.

21. The apparatus of claim 18, wherein the periodicity and offset information includes a value of a periodicity of the signal or the channel, and the signal or the data in the channel is communicated within the on duration according to the periodicity.

22. The apparatus of claim 18, wherein the periodic transmission occasions include all valid occasions for the signal or the channel within the cell DRX cycle or the cell DTX cycle beginning at a time offset with respect to the reference time, the periodicity and offset information including the time offset.

23. The apparatus of claim 18, wherein the periodic transmission occasions include consecutive valid occasions for the signal or the channel beginning at a time offset with respect to the reference time and occurring a specified number of times according to a periodicity, the periodicity and offset information including the time offset and a value of the periodicity.

24. The apparatus of claim 18, wherein the signal configuration is a semi-persistent configuration including a time offset, a value of a periodicity, and a quantity of the periodic transmission occasions for the signal or the channel, the signal or the data in the channel being communicated within the on duration according to the periodicity following activation of the periodic transmission occasions and beginning at the time offset with respect to the reference time over the quantity of the periodic transmission occasions.

25. The apparatus of claim 18, wherein the periodicity and offset information includes a time offset and a value of a periodicity, and the one or more processors, individually or in any combination, are further operable to cause the apparatus to:

send, during the on duration, an activation signal for the signal or the channel after the time offset, wherein in response to the activation signal being sent after the time offset, the signal or the data in the channel is communicated during the on duration beginning at a next available transmission occasion following the time offset according to the periodicity.

26. A method of wireless communication performable at network entity, comprising:

sending, to a user equipment (UE), a signal configuration indicating periodicity and offset information for a signal or a channel, the periodicity and offset information configured to align periodic transmission occasions of the signal or the channel within an on duration of a cell Discontinuous Reception (DRX) cycle or a cell Discontinuous Transmission (DTX) cycle beginning with respect to a reference time associated with the cell DRX cycle or the cell DTX cycle; and communicating the signal or data in the channel with the UE within the on duration according to the periodicity and offset information.

27. The method of claim 26, wherein the periodic transmission occasions include all valid occasions for the signal or the channel within the cell DRX cycle or the cell DTX cycle beginning at a time offset with respect to the reference time, the periodicity and offset information including the time offset.

28. The method of claim 26, wherein the periodic transmission occasions include consecutive valid occasions for the signal or the channel beginning at a time offset with respect to the reference time and occurring a specified number of times according to a periodicity, the periodicity and offset information including the time offset and a value of the periodicity.

29. The method of claim 26, wherein the signal configuration is a semi-persistent configuration including a time offset, a value of a periodicity, and a quantity of the periodic transmission occasions for the signal or the channel, the signal or the data in the channel being communicated within the on duration according to the periodicity following activation of the periodic transmission occasions and beginning at the time offset with respect to the reference time over the quantity of the periodic transmission occasions.

30. The method of claim 26, wherein the periodicity and offset information includes a time offset and a value of a periodicity, and the method further comprises:

sending, during the on duration, an activation signal for the signal or the channel after the time offset, wherein in response to the activation signal being sent after the time offset, the signal or the data in the channel is communicated during the on duration beginning at a next available transmission occasion following the time offset according to the periodicity.

* * * * *